(12) United States Patent
Wang et al.

(10) Patent No.: US 9,708,481 B2
(45) Date of Patent: Jul. 18, 2017

(54) BLOW MOLDED ARTICLE BASED ON BIMODAL RANDOM COPOLYMER

(71) Applicant: BOREALIS AG, Vienna (AT)

(72) Inventors: Jingbo Wang, Linz (AT); Katja Klimke, Abu Dhabi (AE); Petar Doshev, Linz (AT); Pauli Leskinen, Helsinki (FI)

(73) Assignee: Borealis AG, Vienna (AT)

( * ) Notice: Subject to any disclaimer, the term of this patent is extended or adjusted under 35 U.S.C. 154(b) by 0 days.

(21) Appl. No.: 15/029,493

(22) PCT Filed: Oct. 23, 2014

(86) PCT No.: PCT/EP2014/072764
§ 371 (c)(1),
(2) Date: Apr. 14, 2016

(87) PCT Pub. No.: WO2015/059230
PCT Pub. Date: Apr. 30, 2015

(65) Prior Publication Data
US 2016/0237270 A1  Aug. 18, 2016

(30) Foreign Application Priority Data
Oct. 24, 2013 (EP) .................... 13190138

(51) Int. Cl.
C08L 23/14 (2006.01)
B65D 1/02 (2006.01)

(52) U.S. Cl.
CPC .......... C08L 23/142 (2013.01); B65D 1/0207 (2013.01); C08L 23/14 (2013.01); C08L 2203/10 (2013.01); C08L 2205/02 (2013.01); C08L 2205/025 (2013.01)

(58) Field of Classification Search
CPC .... C08L 23/142; C08L 23/14; C08L 2203/10; C08L 2205/02; C08L 2205/025; B65D 1/0207
See application file for complete search history.

(56) References Cited

U.S. PATENT DOCUMENTS

| | | |
|---|---|---|
| 4,107,414 A | 8/1978 | Giannini et al. |
| 4,186,107 A | 1/1980 | Wagner |
| 4,226,963 A | 10/1980 | Giannini et al. |
| 4,347,160 A | 8/1982 | Epstein et al. |
| 4,382,019 A | 5/1983 | Greco |
| 4,435,550 A | 3/1984 | Ueno et al. |
| 4,465,782 A | 8/1984 | McKenzie |
| 4,472,524 A | 9/1984 | Albizzati |
| 4,473,660 A | 9/1984 | Albizzati et al. |
| 4,522,930 A | 6/1985 | Albizzati et al. |
| 4,530,912 A | 7/1985 | Pullukat et al. |
| 4,532,313 A | 7/1985 | Matlack |
| 4,560,671 A | 12/1985 | Gross et al. |
| 4,581,342 A | 4/1986 | Johnson et al. |
| 4,657,882 A | 4/1987 | Karayannis et al. |
| 4,665,208 A | 5/1987 | Welborn, Jr. et al. |
| 4,874,734 A | 10/1989 | Kioka et al. |
| 4,908,463 A | 3/1990 | Bottelberghe |
| 4,924,018 A | 5/1990 | Bottelberghe |
| 4,952,540 A | 8/1990 | Kioka et al. |
| 4,968,827 A | 11/1990 | Davis |
| 5,091,352 A | 2/1992 | Kioka et al. |
| 5,103,031 A | 4/1992 | Smith, Jr. |
| 5,157,137 A | 10/1992 | Sangokoya |
| 5,204,419 A | 4/1993 | Tsutsui et al. |
| 5,206,199 A | 4/1993 | Kioka et al. |
| 5,235,081 A | 8/1993 | Sangokoya |
| 5,248,801 A | 9/1993 | Sangokoya |
| 5,308,815 A | 5/1994 | Sangokoya |
| 5,329,032 A | 7/1994 | Tran et al. |
| 5,391,529 A | 2/1995 | Sangokoya |
| 5,391,793 A | 2/1995 | Marks et al. |
| 5,504,172 A | 4/1996 | Imuta et al. |
| 5,529,850 A | 6/1996 | Morini et al. |

(Continued)

FOREIGN PATENT DOCUMENTS

| | | |
|---|---|---|
| CN | 102869719 A | 1/2013 |
| CN | 103347951 A | 10/2013 |

(Continued)

OTHER PUBLICATIONS

European Patent Office, International Search Report in International Application No. PCT/EP2014/072764 (Jan. 26, 2015).
"Glossary of Basic Terms in Polymer Science (IUPAC Recommendations 1996)," Pure Appl. Chem., 68(8):1591-1595 (1996).
"MDO Film—Oriented PE and PP packaging film," IN0128/GB FF Oct. 2004, Borealis A/S (2004).
Atwood, "Chapter 6: Anionic and Cationic Orgoanoaluminum Compounds," Coord. Chem. Alum., VCH, New York, NY, pp. 197-232 (1993).
Britovsek et al . "The Search for New-Generation Olefin Polymerization Catalysts: Life beyond Metallocenes," Angew. Chem, Int. Ed.,. vol. 38, pp. 428-447 (1999).
Busico et al., "Alk-1-ene Polymerization in the Presence of a Monocyclopentadienyl Zirconium(IV) Acetamidinate Catalyst: Microstructural and Mechanistic Insights$^a$," Macromol. Rapid Commun., 28:1128-1134 (2007).

(Continued)

Primary Examiner — Nathan M Nutter
(74) Attorney, Agent, or Firm — Leydig, Voit & Mayer, Ltd.

(57) ABSTRACT

Blow molded article comprising a propylene copolymer composition, the propylene copolymer composition comprises (a) a propylene copolymer (A) having a comonomer content of 0.1 to 2.5 mol-%, the comonomers are $C_5$ to $C_{12}$ α-olefins, and (b) a propylene copolymer (B) having a comonomer content of 1.0 to 7.0 mol-%, the comonomers are $C_5$ to $C_{12}$ α-olefins, wherein further (i) the comonomer content in the propylene copolymer (A) is lower compared to the comonomer content in the propylene copolymer (B), (ii) the propylene copolymer composition has a comonomer content of 0.4 to 5.0 mol-%, the comonomers are $C_5$ to $C_{12}$ α-olefins.

14 Claims, No Drawings

(56) References Cited

U.S. PATENT DOCUMENTS

| | | |
|---|---|---|
| 5,539,067 A | 7/1996 | Parodi et al. |
| 5,618,771 A | 4/1997 | Parodi et al. |
| 5,693,838 A | 12/1997 | Sangokoya et al. |
| 5,731,253 A | 3/1998 | Sangokoya |
| 5,731,451 A | 3/1998 | Smith et al. |
| 5,744,656 A | 4/1998 | Askham |
| 6,316,562 B1 | 11/2001 | Munck et al. |
| 6,586,528 B1 | 7/2003 | Delaite et al. |
| 6,642,317 B1 | 11/2003 | Delaite et al. |
| 7,342,078 B2 | 3/2008 | Schottek et al. |
| 7,569,651 B2 | 8/2009 | Schottek et al. |
| 8,709,561 B2 | 4/2014 | Bernreitner et al. |
| 8,779,062 B2 * | 7/2014 | Paavilainen et al. .. C08F 210/06 525/191 |
| 8,889,792 B2 * | 11/2014 | Paavilainen et al. ...... C08J 5/18 525/191 |
| 9,243,137 B2 | 1/2016 | Reichelt et al. |
| 2003/0149199 A1 | 8/2003 | Schottek et al. |
| 2005/0187367 A1 | 8/2005 | Hori et al. |
| 2006/0020096 A1 | 1/2006 | Schottek et al. |
| 2006/0182987 A1 | 8/2006 | Yu et al. |
| 2007/0235896 A1 | 10/2007 | McLeod et al. |
| 2008/0214767 A1 | 9/2008 | Mehta et al. |
| 2010/0081760 A1 | 4/2010 | Rhee et al. |
| 2011/0031645 A1 | 2/2011 | Kuettel et al. |
| 2013/0178573 A1 | 7/2013 | Paavilainen et al. |
| 2013/0203931 A1 | 8/2013 | Paavilainen et al. |
| 2013/0236668 A1 | 9/2013 | Bernreitner et al. |
| 2014/0005324 A1 | 1/2014 | Reichelt et al. |
| 2016/0185946 A1 | 6/2016 | Sandholzer et al. |
| 2016/0194486 A1 | 7/2016 | Sandholzer et al. |
| 2016/0200838 A1 | 7/2016 | Reznichenko et al. |

FOREIGN PATENT DOCUMENTS

| | | |
|---|---|---|
| EP | 0 045 977 B1 | 1/1987 |
| EP | 0 260 130 A1 | 3/1988 |
| EP | 0 279 586 A2 | 8/1988 |
| EP | 0 045 975 B1 | 4/1989 |
| EP | 0 045 976 B1 | 11/1989 |
| EP | 0 423 101 A2 | 4/1991 |
| EP | 0 491 566 A2 | 6/1992 |
| EP | 0 537 130 A1 | 4/1993 |
| EP | 0 561 476 A1 | 9/1993 |
| EP | 0 045 976 B2 | 12/1993 |
| EP | 0 594-218 A1 | 4/1994 |
| EP | 0 279 586 B1 | 5/1994 |
| EP | 0 622 380 A1 | 11/1994 |
| EP | 0 045 977 B2 | 3/1995 |
| EP | 0 586 390 B1 | 5/1997 |
| EP | 0 591 224 B1 | 2/1998 |
| EP | 0 887 379 A1 | 12/1998 |
| EP | 0 887 380 A1 | 12/1998 |
| EP | 0 887 381 A1 | 12/1998 |
| EP | 1 359 171 A1 | 11/2003 |
| EP | 1 376 516 A1 | 1/2004 |
| EP | 1 183 307 B1 | 7/2005 |
| EP | 0 991 684 B1 | 1/2006 |
| EP | 1 632 529 A1 | 3/2006 |
| EP | 1 448 622 B1 | 4/2006 |
| EP | 1 726 602 A1 | 11/2006 |
| EP | 1 741 725 A1 | 1/2007 |
| EP | 1 788 023 A1 | 5/2007 |
| EP | 1 892 264 A1 | 2/2008 |
| EP | 1 941 998 A1 | 7/2008 |
| EP | 2 075 284 A1 | 7/2009 |
| EP | 2 386 582 A1 | 11/2011 |
| EP | 2 386 583 A1 | 11/2011 |
| EP | 2 386 602 A1 | 11/2011 |
| EP | 2 386 604 A1 | 11/2011 |
| EP | 2 038 346 B1 | 1/2012 |
| EP | 2 410 007 A1 | 1/2012 |
| EP | 2 423 257 A1 | 2/2012 |
| EP | 1 358 252 B1 | 4/2012 |
| EP | 2 532 687 A2 | 12/2012 |
| EP | 2 551 299 A1 | 1/2013 |
| EP | 2 565 221 A1 | 3/2013 |
| EP | 2 573 134 A1 | 3/2013 |
| EP | 2 592 112 A1 | 5/2013 |
| EP | 2 610 270 A1 | 7/2013 |
| EP | 2 610 271 A1 | 7/2013 |
| EP | 2 610 272 A1 | 7/2013 |
| EP | 2 610 273 A1 | 7/2013 |
| JP | 2013-525531 A | 6/2013 |
| JP | 2013-525532 A | 6/2013 |
| WO | WO 87/07620 A1 | 12/1987 |
| WO | WO 92/12182 A1 | 7/1992 |
| WO | WO 92/13029 A1 | 8/1992 |
| WO | WO 92/19653 A1 | 11/1992 |
| WO | WO 92/19658 A1 | 11/1992 |
| WO | WO 92/19659 A1 | 11/1992 |
| WO | WO 92/21705 A1 | 12/1992 |
| WO | WO 93/11165 A1 | 6/1993 |
| WO | WO 93/11166 A1 | 6/1993 |
| WO | WO 93/19100 A1 | 9/1993 |
| WO | WO 94/10180 A1 | 5/1994 |
| WO | WO 94/14856 A1 | 7/1994 |
| WO | WO 95/12622 A1 | 5/1995 |
| WO | WO 95/32994 A1 | 12/1995 |
| WO | WO 97/10248 A1 | 3/1997 |
| WO | WO 97/14700 A1 | 4/1997 |
| WO | WO 97/28170 A1 | 8/1997 |
| WO | WO 97/36939 A1 | 10/1997 |
| WO | WO 98/12234 A1 | 3/1998 |
| WO | WO 98/38041 A1 | 9/1998 |
| WO | WO 98/40331 A1 | 9/1998 |
| WO | WO 98/46616 A1 | 10/1998 |
| WO | WO 98/47929 A1 | 10/1998 |
| WO | WO 98/49208 A1 | 11/1998 |
| WO | WO 98/56831 A1 | 12/1998 |
| WO | WO 98/58976 A1 | 12/1998 |
| WO | WO 99/10353 A1 | 3/1999 |
| WO | WO 99/12981 A1 | 3/1999 |
| WO | WO 99/19335 A1 | 4/1999 |
| WO | WO 99/24478 A1 | 5/1999 |
| WO | WO 99/24479 A1 | 5/1999 |
| WO | WO 99/33842 A1 | 7/1999 |
| WO | WO 99/41290 A1 | 8/1999 |
| WO | WO 00/34341 A2 | 6/2000 |
| WO | WO 00/68315 A1 | 11/2000 |
| WO | WO 01/48034 A2 | 7/2001 |
| WO | WO 01/58970 A1 | 8/2001 |
| WO | WO 01/70395 A2 | 9/2001 |
| WO | WO 02/02576 A1 | 1/2002 |
| WO | WO 02/051912 A1 | 7/2002 |
| WO | WO 02/057342 A2 | 7/2002 |
| WO | WO 03/000754 A1 | 1/2003 |
| WO | WO 03/000755 A2 | 1/2003 |
| WO | WO 03/000756 A2 | 1/2003 |
| WO | WO 03/000757 A1 | 1/2003 |
| WO | WO 03/051934 A2 | 6/2003 |
| WO | WO 03/066698 A1 | 8/2003 |
| WO | WO 03/082879 A1 | 10/2003 |
| WO | WO 2004/000899 A1 | 12/2003 |
| WO | WO 2004/029112 A1 | 4/2004 |
| WO | WO 2004/111095 A1 | 12/2004 |
| WO | WO 2005/105863 A2 | 11/2005 |
| WO | WO 2006/069733 A1 | 7/2006 |
| WO | WO 2006/086134 A1 | 8/2006 |
| WO | WO 2006/097497 A1 | 9/2006 |
| WO | WO 2007/107448 A1 | 9/2007 |
| WO | WO 2007/116034 A1 | 10/2007 |
| WO | WO 2007/122239 A1 | 11/2007 |
| WO | WO 2007/137853 A1 | 12/2007 |
| WO | WO 2008/034630 A1 | 3/2008 |
| WO | WO 2009/027075 A2 | 3/2009 |
| WO | WO 2009/054832 A1 | 4/2009 |
| WO | WO 2009/063819 A1 | 5/2009 |
| WO | WO 2010/009827 A1 | 1/2010 |
| WO | WO 2010/039715 A1 | 4/2010 |
| WO | WO 2010/052260 A1 | 5/2010 |
| WO | WO 2010/053644 A1 | 5/2010 |
| WO | WO 2010/082943 A1 | 7/2010 |

(56) References Cited

FOREIGN PATENT DOCUMENTS

| | | |
|---|---|---|
| WO | WO 2010/142540 A1 | 12/2010 |
| WO | WO 2011/023594 A1 | 3/2011 |
| WO | WO 2011/039305 A1 | 4/2011 |
| WO | WO 2011/135004 A2 | 11/2011 |
| WO | WO 2011/135005 A2 | 11/2011 |
| WO | WO 2011/138211 A1 | 11/2011 |
| WO | WO 2011/160936 A1 | 12/2011 |
| WO | WO 2012/001052 A2 | 1/2012 |
| WO | WO 2012/007430 A1 | 1/2012 |
| WO | WO 2012/093098 A1 | 7/2012 |
| WO | WO 2013/007650 A1 | 1/2013 |
| WO | WO 2013/092624 A1 | 6/2013 |
| WO | WO 2013/127707 A1 | 9/2013 |
| WO | WO 2014/023603 A1 | 2/2014 |
| WO | WO 2014/023604 A1 | 2/2014 |
| WO | WO 2015/022127 A1 | 2/2015 |
| WO | WO 2015/024887 A1 | 2/2015 |
| WO | WO 2015/024891 A1 | 2/2015 |
| WO | WO 2015/044116 A1 | 4/2015 |
| WO | WO 2015/052246 A1 | 4/2015 |
| WO | WO 2015/059229 A1 | 4/2015 |
| WO | WO 2015/059230 A1 | 4/2015 |
| WO | WO 2015/062936 A1 | 5/2015 |
| WO | WO 2015/075088 A1 | 5/2015 |
| WO | WO 2015/082379 A1 | 6/2015 |
| WO | WO 2015/091839 A1 | 6/2015 |

OTHER PUBLICATIONS

Busico et al., "Full Assignment of the $^{13}$C NMR Spectra of Regioregular Polypropylenes: Methyl and Methylene Region," *Macromolecules* 30:6251-6263 (1997).
Busico et al., "Microstructure of polypropylene," *Prog. Polym. Sci.* 26:443-533 (2001).
Castignolles et al., "Detection and quantification of branching in polyacrylates by size-exclusion chromatography (SEC) and melt-state $^{13}$C NMR spectroscopy," *Polymer*, 50(11):2373-2383, (2009).
Cheng, "$^{13}$C NMR Analysis of Ethylene-Propylene Rubbers," *Macromolecules* 17:1950-1955 (1984).
Filip et al., "Heteronuclear decoupling under fast MAS by a rotor-synchronized Hahn-echo pulse train," *J. Magnet. Reson.* 176:239-243 (2005).
Gahleitner et al., "Nucleation of Polypropylene Homo- and Copolymers," *International Polymer Processing* 26(1):2-20 (2011).
Grein et al., "Impact Modified Isotatic Polypropylene with Controlled Rubber Intrinsic Viscosities: Some New Aspects About Morphology and Fracture," *J. Appl. Polymer Sci.*, 87:1702-1712 (2003).
Griffin et al., "Low-load rotor-synchronised Hahn-echo pulse train (RS-HEPT) $^1$H decoupling in solid-state NMR: factors affecting MAS spin-echo dephasing times," Magn. Reson. Chem. 45:S198-S208 (2007).
Holbrey et al., "Liquid clathrate formation in ionic liquid-aromatic mixtures," *Chem. Comm.*, 2003, pp. 476-477.
Kakugo et al., "$^{13}$C NMR Determination of Monomer Sequence Distribution in Ethylene-Propylene Copolymers Prepared with δ-TiCl$_3$—Al(C$_2$H$_5$)$_2$Cl," *Macromolecules* 15:1150-1152 (1982).
Klimke et al., "Optimisation and Application of Polyolefin Branch Quantification by Melt-State $^{13}$C NMR Spectroscopy," *Macromol. Chem. Phys.* 207(4):382-395 (2006).
McAuley et al., "On-line Inference of Polymer Properties in an Industrial Polyethylene Reactor,"*AlChE Journal*, vol. 37, No. 6, 825-835 (1991).
Myhre et al., "Oriented PE films—Expanding Opportunities with Borstar® PE," Maack Speciality Films, pp. 1-10 (2001).
Parkinson et al., "Effect of Branch Length on $^{13}$C NMR Relaxation Properties in Molten Poly[ethylene-co-(α-olefin)] Model Systems," *Macromol. Chem. Phys.* 208(19-20):2128-2133 (2007).

*Plastics Additives Handbook*, 5th edition, Hans Zweifel, Editor, Hanser Publishers, Munich, pp. 871-873 (2001).
*Plastics Additives Handbook*, 5th edition, Hans Zweifel, Editor, Hanser Publishers, Munich, pp. 956-965 (2001).
Pollard et al., "Observation of Chain Branching in Polyethylene in the Solid State and Melt via 13C NMR Spectroscopy and Melt NMR Relaxation Time Measurements," *Macromolecules*, 37(3):813-825 (2004).
*Propylene Handbook*, 2$^{nd}$ Edition, Chapter 7.2.2 "Oriented Films," pp. 405-415, Nello Pasquini, Editor, Hanser (2005).
Randall, "A Review of High Resolution Liquid $^{13}$Carbon Nuclear Magnetic Resonance Characterizations of Ethylene-Based Polymers," *JMS-Rev. Macromol. Chem. Phys.*, C29(2 & 3):201-317 (1989).
Resconi et al., "Diastereoselective Synthesis, Molecular Structure, and Solution Dynamics of meso- and rac-[Ethylenebis(4,7-dimethyl-η5-1-indenyl)]zirconium Dichloride Isomers and Chain Transfer Reactions in Propene Polymerization with the rac Isomer," *Organometallics* 15(23):5046-5059 (1996).
Resconi et al., "Highly Regiospecific Zirconocene Catalysts for the Isospecific Polymerization of Propene," *JACS* 120(10):2308-2321 (1998).
Resconi et al., "Selectivity in Propene Polymerization with Metallocene Catalysts," *Chem. Rev.* 100(4):1253-1345 (2000).
Singh et al., "Triad sequence determination of ethylene-propylene copolymers—application of quantitative $^{13}$C NMR," *Polymer Testing* 28(5):475-479 (2009).
Spaleck et al., "The Influence of Aromatic Substituents on the Polymerization Behavior of Bridged Zirconocene Catalysts," *Organometallics* 13:954-963 (1994).
Spear et al., "Liquid Clathrates," *Encyclopedia of Supramolecular Chemistry*, J.L. Atwood and J.W. Steed (Eds.); Marcel Dekker: New York, pp. 804-808 (2004).
Wang et al., "Structural Analysis of Ethylene/Propylene Copolymers Synthesized with a Constrained Geometry Catalyst," *Macromolecules* 33:1157-1162 (2000).
Zhou et al., "A new decoupling method for accurate quantification of polyethylene copolymer composition and triad sequence distribution with $^{13}$C NMR," *J. Magnet. Reson.* 187:225-233 (2007).
European Patent Office, Written Opinion in International Application No. PCT/EP2014/072764 (Jan. 26, 2015).
European Patent Office, International Preliminary Report on Patentability in International Application No. PCT/EP2014/072764 (Apr. 26, 2016).
Canadian Intellectual Property Office, Examination Report in Canadian Patent Application No. 2,927,108 (May 3, 2016).
Japan Patent Office, Notice of Reasons for Rejection in Japanese Patent Application No. 2016-522787 (Oct. 11, 2016).
U.S. Appl. No. 14/911,295, filed Feb. 10, 2016.
U.S. Appl. No. 14/911,299, filed Feb. 10, 2016.
U.S. Appl. No. 14/911,300, filed Feb. 10, 2016.
U.S. Appl. No. 14/914,501, filed Feb. 25, 2016.
U.S. Appl. No. 15/022,664, filed Mar. 17, 2016.
U.S. Appl. No. 15/022,671, filed Mar. 17, 2016.
U.S. Appl. No. 15/027,129, filed Apr. 4, 2016.
U.S. Appl. No. 15/030,556, filed Apr. 19, 2016.
U.S. Appl. No. 15/039,107, filed May 25, 2016.
U.S. Appl. No. 15/101,837, filed Jun. 3, 2016.
U.S. Appl. No. 15/102,628, filed Jun. 8, 2016.
U.S. Appl. No. 15/103,744, filed Jun. 10, 2016.
U.S. Appl. No. 15/103,783, filed Jun. 10, 2016.
U.S. Appl. No. 15/106,101, filed Jun. 17, 2016.
U.S. Appl. No. 15/113,517, filed Jul. 22, 2016.
U.S. Appl. No. 15/113,907, filed Jul. 25, 2016.
U.S. Appl. No. 15/113,922, filed Jul. 25, 2016.
U.S. Appl. No. 15/115,929, filed Aug. 2, 2016.
State Intellectual Property Office of the People's Republic of China, First Notification of Office Action in Chinese Patent Application No. 201480056646.X (Sep. 6, 2016).

\* cited by examiner

BLOW MOLDED ARTICLE BASED ON
BIMODAL RANDOM COPOLYMER

CROSS-REFERENCE TO RELATED
APPLICATIONS

This patent application is the U.S. national phase of International Application No. PCT/EP2014/072764, filed on Oct. 23, 2014, which claims the benefit of European Patent Application No. 13190138.1, filed Oct. 24, 2013, the disclosures of which are incorporated herein by reference in their entireties for all purposes.

The present invention is directed to a new blow molded article comprising a propylene copolymer composition (P) and the use of a propylene copolymer composition (P) to improve the impact-stiffness-balance and/or the bottle appearance factor of a blow molded article.

It is well known in the polymer field that different applications require specifically tailored polymers to achieve the individual demanding properties. For instance a polymer used for injection molding must necessarily have other properties as a polymer used for blow molding.

The blow molding process for instance, like the extrusion blow molding process or the injection stretch blow molding process, is a very special process that allows in a flexible and cheap way the preparation of different kind of bottles with respect to size and shape. Main drawback in this process is that the solidification step is very special compared to normal injection molding processes.

In the extrusion blow molding (EBM) process a polymer melt is first extruded through a tubular die into air forming a polymer tube, subsequently blowing up said polymer tube (typically called "parison" in this technical field) until the outside of the tube reaches the boundaries of the mold. To cover the wall of the mold fully with the blown up polymer tube is rather difficult compared to injection molding because the air between polymer tube and mold has to be removed totally which is a demanding process step. Further the inside of the polymer tube is not in contact with the mold and therefore there is only little possibility to influence the inner surface structure of the tube. As a consequence thereof extrusion blown molded articles, like bottles, normally show inferior optical properties compared to any injection molded articles. For instance, the surface property inside and/or outside of extrusion blown bottles is typically non-uniform (flow lines, melt fracture) leading to lower overall gloss and transparency compared to injection molded bottles. An alternative blow molding process it the injection stretch blow molding (ISBM) process, where a preform is produced by injection molding followed by stretching and blowing the preform until the outside of the preform reaches the boundaries of the mold. The same problems as for extrusion blow molding process (EBM) occur also at the ISBM process. This leads for instance, that the surface property inside and/or outside of injection stretch blown moulded bottles is typically non-uniform (flow lines, melt fracture) leading to lower overall gloss and transparency compared to injection molded bottles Furthermore, it has become clear in the meantime that gloss or transparency should not be the only values to be used for judging the quality of the optical properties of blow molded (EBM) articles. For instance it has been recognized that the visual appearance of blow molded articles, like extrusion blow molded articles, is inacceptable even though the gloss values have been rather high. Thus, it became clear that the gloss values alone were not enough to judge the optical appearance of the bottles and hence a new parameter, the so-called bottle appearance factor (BAF), which is defined as BAF=(clarity*gloss)/haze, has been introduced. In this context, it is further to be noted that blow molded articles, like extrusion blow molded articles, like bottles, must fulfil all the strict regulations (Pharmacoppoeia and FDA) governing blow, fill and seal applications if they are considered for the healthcare market. One requirement for blow molded articles, as extrusion blow molded articles, is that they are sterilisable. However, during sterilisation of blow molded articles, like extrusion blow molded articles, the BAF typically decreases such that it is below the BAF determined before sterilisation.

Furthermore, the blow molded articles, like extrusion blow molded articles, shall have a high impact strength as well as stiffness as they prevent damages caused by fallings from rather high altitudes and allow to broaden the application area and to use less material during production, which results in a reduced $CO_2$ footprint.

Accordingly, there is still a demand for blow molded articles, like extrusion blow molded articles, having an improved bottle appearance factor (BAF) after sterilisation and a good impact-stiffness-balance.

Thus, the object of the present invention is to provide a blow molded article, like an extrusion blow molded article, having an improved bottle appearance factor (BAF) after sterilisation and a good impact-stiffness-balance.

The finding of the present invention is to provide a blow molded article, like an extrusion blow molded article, comprising a propylene copolymer composition having rather low comonomer content, the comonomers are long chain α-olefins, and said propylene copolymer composition comprises two different fractions of propylene copolymers, said fractions differ in the comonomer content.

Accordingly, the present invention is directed to an extrusion blow molded article comprising a propylene copolymer composition (P), the propylene copolymer composition (P) comprises (a) a propylene copolymer (A) having a comonomer content of 0.1 to 2.5 mol-%, the comonomers are $C_5$ to $C_{12}$ α-olefins, and (b) a propylene copolymer (B) having a comonomer content of 1.0 to 7.0 mol-%, the comonomers are $C_5$ to $C_{12}$ α-olefins, wherein further (i) the comonomer content in the propylene copolymer (A) is lower compared to the comonomer content in the propylene copolymer (B), (ii) the propylene copolymer composition (P) has a comonomer content of 0.4 to 5.0 mol-%, the comonomers are $C_5$ to $C_{12}$ α-olefins.

It has surprisingly been found that such a blow molded article, like extrusion blow molded article, has a very good impact-stiffness-balance as well as an improved bottle appearance factor (BAF) after sterilisation of the blow molding article, like the extrusion blow molded (EBM) article.

In the following the invention is defined in more detail.

The propylene copolymer composition (P) being part of the inventive blow molded article, like the extrusion blow molded article, is featured by a rather low comonomer content. The rather low comonomer content is achieved due to the fact that the propylene copolymer composition (P) comprises two fractions of propylene copolymer as defined herein. A "comonomer" according to this invention is a polymerizable unit different to propylene. Accordingly, it is one requirement of the present invention that the propylene copolymer composition (P) has a comonomer content in the range from 0.4 to 5.0 mol-%, based on the total weight of the propylene copolymer composition (P). It is preferred that the propylene copolymer composition (P) has a comonomer content in the range of 0.6 to 4.0 mol-%, more preferably in the range of 1.0 to 3.5 mol-%, still more preferably in the range of 1.2 to 3.0 mol-%, based on the propylene copolymer composition (P).

The comonomers of the propylene copolymer composition (P) are $C_5$ to $C_{12}$ α-olefins, e.g. 1-hexene and/or 1-octene. The propylene copolymer composition (P) of the present invention may contain more than one type of comonomer. Thus, the propylene copolymer composition (P) of the present invention may contain one, two or three different comonomers, the comonomers are selected from the group of $C_5$ α-olefin, $C_6$ α-olefin, $C_7$ α-olefin, $C_8$ α-olefin, $C_9$ α-olefin, $C_{10}$ α-olefin, $C_{11}$ α-olefin, and $C_{12}$ α-olefin. However, it is preferred that the propylene copolymer composition (P) contains only one type of comonomer. Preferably the propylene copolymer composition (P) comprises—apart from propylene—only 1-hexene and/or 1-octene. In an especially preferred embodiment the comonomer of the propylene copolymer composition (P) is only 1-hexene.

Accordingly, the propylene copolymer composition (P) is preferably a propylene 1-hexene copolymer.

The propylene copolymer composition (P) as well as the propylene copolymer (A) and the propylene copolymer (B) according to this invention are preferably random propylene copolymers. The term "random copolymer" has to be preferably understood according to IUPAC (Pure Appl. Chem., Vol. No. 68, 8, pp. 1591 to 1595, 1996). Preferably the molar concentration of comonomer dyads, like 1-hexene dyads, obeys the relationship $$[HH] < [H]^2$$

wherein
[HH] is the molar fraction of adjacent comonomer units, like of adjacent 1-hexene units, and
[H] is the molar fraction of total comonomer units, like of total 1-hexene units, in the polymer.

Preferably, the propylene copolymer composition (P) as well as the propylene copolymer (A) and the propylene copolymer (B) as defined in detail below are isotactic. Accordingly it is appreciated that the propylene copolymer composition (P), the propylene copolymer (A) and the propylene copolymer (B) have a rather high isotactic triad concentration, i.e. higher than 90.0%, more preferably higher than 92.0%, still more preferably higher than 93.0% and yet more preferably higher than 95.0%, like higher than 97.0%.

The molecular weight distribution (MWD) is the relation between the numbers of molecules in a polymer and the individual chain length. The molecular weight distribution (MWD) is expressed as the ratio of weight average molecular weight ($M_w$) and number average molecular weight ($M_n$). The number average molecular weight ($M_n$) is an average molecular weight of a polymer expressed as the first moment of a plot of the number of molecules in each molecular weight range against the molecular weight. In effect, this is the total molecular weight of all molecules divided by the number of molecules. In turn, the weight average molecular weight ($M_w$) is the first moment of a plot of the weight of polymer in each molecular weight range against molecular weight.

The number average molecular weight ($M_n$) and weight average molecular weight ($M_w$) as well as the molecular weight distribution (MWD) are determined by size exclusion chromatography (SEC) using Waters Alliance GPCV 2000 instrument with online viscometer. The oven temperature is 140° C. Trichlorobenzene is used as a solvent (ISO 16014).

Accordingly it is preferred that the inventive propylene copolymer composition (P) has a weight average molecular weight ($M_w$) from 100 to 700 kg/mol, more preferably from 150 to 400 kg/mol.

The number average molecular weight ($M_n$) of the propylene copolymer composition (P) is preferably in the range of 25 to 200 kg/mol, more preferably from 30 to 150 kg/mol.

Further it is appreciated that the molecular weight distribution (MWD) measured according to ISO 16014 is not more than 4.0, more preferably not more than 3.5, like not more than 3.0. Thus the molecular weight distribution (MWD) of the propylene copolymer composition (P) is preferably between 2.0 to 4.0, still more preferably in the range of 2.0 to 3.5, like 2.0 to 3.0.

Furthermore, it is preferred that the propylene copolymer composition (P) of the present invention has a melt flow rate (MFR) given in a specific range. The melt flow rate measured under a load of 2.16 kg at 230° C. (ISO 1133) is denoted as $MFR_2$ (230° C.). Accordingly, it is preferred that in the present invention the propylene copolymer composition (P) has a melt flow rate $MFR_2$ (230° C.) measured according to ISO 1133 in the range of 1.0 to 20.0 g/10 min, more preferably in the range of 1.0 to 15.0 g/10 min, still more preferably in the range of 1.0 to 10.0 g/10 min, even more preferably in the range of 1.5 to 5.0 g/10 min, like in the range of 1.9 to 3.5 g/10 min.

The melting temperature ($T_m$) measured according to ISO 11357-3 of the propylene copolymer composition (P) is preferably at least 125.0° C., more preferably of at least 128° C. Thus, it is in particular appreciated that the melting temperature ($T_m$) measured according to ISO 11357-3 of the propylene copolymer composition (P) is in the range of 125 to 145° C., more preferably in the range of 128 to 140° C.

Additionally it is appreciated that the propylene copolymer composition (P) of the instant invention has a crystallization temperature ($T_c$) measured according to ISO 11357-3 of at least 88° C., more preferably of at least 90° C. Accordingly the inventive propylene copolymer composition (P) has preferably a crystallization temperature (TO measured according to ISO 11357-3 in the range of 88 to 110° C., more preferably in the range of 90 to 105° C.

Additionally, the propylene copolymer composition (P) can be defined by the xylene cold soluble (XCS) content measured according to ISO 6427. Accordingly the propylene copolymer composition (P) is preferably featured by a xylene cold soluble (XCS) content of ≤10.0 wt.-%, more preferably of ≤7.5 wt.-%, yet more preferably equal or below 5.0 wt.-%, still more preferably below 4.0 wt.-%, like below 3.0 wt.-%, based on the total weight of the propylene copolymer composition (P). Thus, it is in particular appreciated that the propylene copolymer composition (P) of the instant invention has a xylene cold soluble (XCS) content in the range of 0.3 to 10.0 wt.-%, more preferably in the range of 0.5 to 7.5 wt.-%, yet more preferably in the range of 0.5 to 5.0 wt.-%, like in the range from 0.7 to 2.5 wt.-%. based on the total weight of the propylene copolymer composition (P).

The propylene copolymer composition (P) of the present invention is further defined by its polymer fractions present. Accordingly the propylene copolymer composition (P) of the present invention comprises at least, preferably consists of, two fractions, namely the propylene copolymer (A) and the propylene copolymer (B).

Preferably, the propylene copolymer composition (P) comprises the propylene copolymer (A) and the propylene copolymer (B) as the only polymer components.

It is preferred that the weight ratio between the propylene copolymer (A) and the propylene copolymer (B) [(A)/(B)] is in the range of 20/80 to 80/20, more preferably in the range of 30/70 to 70/30, still more preferably in the range of 60/40 to 40/60.

Further, the propylene copolymer (A) is preferably the comonomer lean fraction whereas the propylene copolymer (B) is the comonomer rich fraction. Accordingly, the comonomer content in the propylene copolymer (A) is lower compared to the comonomer content of the propylene copolymer (B). Preferably, the propylene copolymer composition (P) fulfils the correlation com (B)/com (A) in that com (B)/com (A) is ≤6.0, more preferably the correlation com (B)/com (A) is in the range of 2.0 to 6.0, even more preferably being in the range of 2.5 to 5.5, still more preferably in the range of 2.5 to 5.0 and most preferably in the range of 2.5 to 4.5
wherein
com (A) is the comonomer content of the propylene copolymer (A) given in mol percent [mol-%],
com (B) is the comonomer content of the propylene copolymer (B) given in mol percent [mol-%].

Additionally or alternatively, the propylene copolymer composition (P) fulfils the correlation com (P)/com (A) in that com (P)/com (A) is ≤6.0, more preferably the correlation com (B)/com (A) is in the range of 1.0 to 6.0, more preferably in the range of 1.2 to 5.0, still more preferably being in the range of 1.5 to 4.0 and most preferably in the range of 2.0 to 3.0 wherein
com (A) is the comonomer content of the propylene copolymer (A) given in mol percent [mol-%],
com (P) is the comonomer content of the propylene copolymer composition (P) given in mol percent [mol-%].

Additionally or alternatively, the comonomer content in the propylene copolymer (B) is higher compared to the comonomer content of the copolymer composition (P). Thus, it is appreciated that the propylene copolymer composition (P) fulfils the correlation com (P)/com (B) in that com (P)/com (B) is <1.0, preferably the correlation com (P)/com (B) is in the range of 0.2 to 0.95, more preferably being in the range of 0.3 to 0.9, still more preferably in the range of 0.4 to 0.9 and most preferably in the range of 0.6 to 0.9
wherein
com (P) is the comonomer content of the propylene copolymer composition (P) given in mol percent [mol-%],
com (B) is the comonomer content of the propylene copolymer (B) given in mol percent [mol-%].

Thus, it is one requirement of the present invention that the propylene copolymer (A) has a comonomer content of 0.1 to 2.5 mol-%, based on the total weight of the propylene copolymer (A). It is appreciated that the propylene copolymer (A) has a comonomer content in the range of 0.1 to 1.5 mol-%, yet more preferably in the range of 0.5 to 1.0 mol-%, based on the propylene copolymer (A).

The comonomers of the propylene copolymer (A) are $C_5$ to $C_{12}$ α-olefins, more preferably the comonomers of the propylene copolymer (A) are selected from the group of $C_5$ α-olefin, $C_6$ α-olefin, $C_7$ α-olefin, $C_8$ α-olefin, $C_9$ α-olefin, $C_{10}$ α-olefin, $C_{11}$ α-olefin and $C_{12}$ α-olefin, still more preferably the comonomers of the propylene copolymer (A) are 1-hexene and/or 1-octene. The propylene copolymer (A) may contain more than one type of comonomer. Thus, the propylene copolymer (A) of the present invention may contain one, two or three different comonomers. However, it is preferred that the propylene copolymer (A) contains only one type of comonomer. Preferably, the propylene copolymer (A) comprises—apart from propylene—only 1-hexene and/or 1-octene. In an especially preferred embodiment the comonomer of the propylene copolymer (A) is only 1-hexene Accordingly, the propylene copolymer (A) is preferably a propylene 1-hexene copolymer.

Thus, the propylene copolymer (A) is in one preferred embodiment a propylene copolymer of propylene and 1-hexene only, wherein the 1-hexene content is in the range of more than 0.1 to 2.5 mol-%, yet more preferably in the range of 0.1 to 1.5 mol-%, based on the propylene copolymer (A).

As stated above, the propylene copolymer (B) has higher comonomer content than the propylene copolymer (A). Accordingly, the propylene copolymer (B) has a comonomer content of 1.0 to 7.0 mol-%, preferably of 1.5 to 5.0 mol-%, more preferably of 2.0 to 4.0 mol-%, based on the propylene copolymer (B).

The comonomers of the propylene copolymer (B) are $C_5$ to $C_{12}$ α-olefins, more preferably the comonomers of the propylene copolymer (B) are selected from the group of $C_5$ α-olefin, $C_6$ α-olefin, $C_7$ α-olefin, $C_8$ α-olefin, $C_9$ α-olefin, $C_{10}$ α-olefin, $C_{11}$ α-olefin, and $C_{12}$ α-olefin, still more preferably the comonomers of the propylene copolymer (B) are 1-hexene and/or 1-octene. The propylene copolymer (B) may contain more than one type of comonomer. Thus, the propylene copolymer (B) of the present invention may contain one, two or three different comonomers. However, it is preferred that the propylene copolymer (B) contains only one type of comonomer. Preferably, the propylene copolymer (B) comprises—apart from propylene—only 1-hexene and/or 1-octene. In an especially preferred embodiment the comonomer of the propylene copolymer (B) is only 1-hexene.

Accordingly, the propylene copolymer (B) is preferably a propylene 1-hexene copolymer.

Thus, the propylene copolymer (B) is in a preferred embodiment a propylene copolymer of propylene and 1-hexene only, wherein the 1-hexene content is in the range of 1.0 to 7.0 mol-%, preferably of 1.5 to 5.0 mol-%, more preferably of 2.0 to 4.0 mol-%, based on the propylene copolymer (B).

In one embodiment of the present invention, the comonomers of the propylene copolymer (A) and of the propylene copolymer (B) are independently selected from the group of $C_5$ α-olefin, $C_6$ α-olefin, $C_7$ α-olefin, $C_8$ α-olefin, $C_9$ α-olefin, $C_{10}$ α-olefin, $C_{11}$ α-olefin and $C_{12}$ α-olefin. Alternatively, the comonomers of the propylene copolymer (A) and of the propylene copolymer (B) are the same and are selected from the group of $C_5$ α-olefin, $C_6$ α-olefin, $C_7$ αolefin, $C_8$ α-olefin, $C_9$ α-olefin, $C_{10}$ α-olefin, $C_{11}$ α-olefin and $C_{12}$ α-olefin.

It is preferred that the comonomers of the propylene copolymer (A) and of the propylene copolymer (B) and thus also of the propylene copolymer composition (P) are the same. Accordingly, in one preferred embodiment the propylene copolymer composition (P) of the instant invention comprises, preferably comprises only, a propylene copolymer (A) and a propylene copolymer (B), in both polymers the comonomer is only 1-hexene.

One important aspect of the present invention is that the propylene copolymer (A) and the propylene copolymer (B) differ in the comonomer content. Additionally, the propylene copolymer (A) and the propylene copolymer (B) may also differ in the melt flow rate. Accordingly, the ratio MFR (A)/MFR (B) is preferably in the range of 0.05 to 1.5, more preferably in the range of 0.1 to 1.0, yet more preferably in the range of 0.1 to 0.5,
wherein
MFR (A) is the melt flow rate MFR$_2$ (230° C.) [g/10 min] measured according to ISO 1133 of the propylene copolymer (A),
MFR (B) is the melt flow rate MFR$_2$ (230° C.) [g/10 min] measured according to ISO 1133 of the propylene copolymer (B).

In one embodiment of the present invention, the melt flow rate MFR$_2$ (230° C.) measured according to ISO 1133 of the propylene copolymer (A) is lower than the melt flow rate MFR$_2$ (230° C.) measured according to ISO 1133 of the propylene copolymer (B).

In one embodiment of the present invention, the ratio MFR (A)/MFR (P) is preferably in the range of 0.1 to 1.5, more preferably in the range of 0.1 to 1.0, yet more preferably in the range of 0.2 to 0.7,
wherein
MFR (A) is the melt flow rate MFR$_2$ (230° C.) [g/10 min] measured according to ISO 1133 of the propylene copolymer (A),
MFR (P) is the melt flow rate MFR$_2$ (230° C.) [g/10 min] measured according to ISO 1133 of the propylene copolymer composition (P).

In one embodiment of the present invention, the melt flow rate MFR$_2$ (230° C.) measured according to ISO 1133 of the propylene copolymer (A) is lower than the melt flow rate MFR$_2$ (230° C.) measured according to ISO 1133 of the propylene copolymer composition (P).

Additionally or alternatively, the ratio MFR (B)/MFR (P) is preferably in the range of 0.5 to 5.0, more preferably in the range of 1.0 to 4.0, yet more preferably in the range of 1.5 to 3.5,
wherein
MFR (B) is the melt flow rate MFR$_2$ (230° C.) [g/10 min] measured according to ISO 1133 of the propylene copolymer (B),
MFR (P) is the melt flow rate MFR$_2$ (230° C.) [g/10 min] measured according to ISO 1133 of the propylene copolymer composition (P).

In one embodiment of the present invention, the melt flow rate MFR$_2$ (230° C.) measured according to ISO 1133 of the propylene copolymer (B) is higher than the melt flow rate MFR$_2$ (230° C.) measured according to ISO 1133 of the propylene copolymer composition (P).

Further, it is appreciated that the propylene copolymer (A) has a melt flow rate MFR$_2$ (230° C.) measured according to ISO 1133 in the range of 0.1 to 10.0 g/10 min, more preferably in the range of 0.2 to 8.0 g/10 min, still more preferably in the range of 0.2 to 5.0 g/10 min, yet more preferably in the range of 0.3 to 2.5 g/10 min, like 0.4 to 1.5 g/10 min.

As mentioned above, it is appreciated that the propylene copolymer (A) has a lower MFR$_2$ (230° C.) measured according to ISO 1133 than the propylene copolymer (B).

It is thus preferred that the propylene copolymer (B) has a melt flow rate MFR$_2$ (230° C.) measured according to ISO 1133 in the range of 1.0 to 20.0 g/10 min, more preferably in the range of 1.5 to 15.0 g/10 min, still more preferably in the range of 2.0 to 10.0 g/10 min, yet more preferably in the range of 2.2 to 7.5 g/10 min, like 3.0 to 6.0 g/10 min.

As a high melt flow rate indicates a low molecular weight, it is appreciated that the propylene copolymer (A) has a weight average molecular weight ($M_w$) of below 450 kg/mol, still more preferably of below 400 kg/mol, yet more preferably in the range of 150 to below 450 kg/mol, like in the range of 180 to 400 kg/mol.

Further, the propylene copolymer (A) has preferably a xylene cold soluble (XCS) content of ≤10.0 wt.-%, more preferably of ≤7.5 wt.-%, still more preferably in the range of 0.5 to 10.0 wt.-%, yet more preferably in the range of 1.0 to 7.5 wt.-%, still more preferably in the range of 1.5 to 5.0 wt.-%, like in the range of 2.0 to 4.0 wt.-%.

Additionally or alternatively, the propylene copolymer (B) has preferably a xylene cold soluble (XCS) content of ≤10.0 wt.-%, more preferably of ≤7.5 wt.-%, still more preferably in the range of 0.5 to 10.0 wt.-%, yet more preferably in the range of 1.0 to 7.5 wt.-%, still more preferably in the range of 1.5 to 5.0 wt.-%, like in the range of 2.0 to 4.0 wt.-%.

It is preferred that the propylene copolymer (A) has a higher xylene cold soluble (XCS) content than the propylene copolymer (B).

The propylene copolymer composition (P) may contain additives known in the art, like antioxidants, nucleating agents, slip agents and antistatic agents. The polymer fraction, preferably the sum of the propylene copolymer (A) and the propylene copolymer (B) fractions, is at least 90 wt.-%, more preferably at least 95 wt.-%, still more preferably at least 98 wt.-%, like at least 99 wt.-% based on the total weight of the propylene copolymer composition (P).

The propylene copolymer composition (P) is in particular obtainable, preferably obtained, by a process as defined in detail below.

The present invention is especially directed to a blow molded article, like an extrusion blow molded (EBM) article or an injection stretch blow molded (ISBM) article, comprising the propylene copolymer composition (P).

Accordingly, the present invention is directed to a blow molded article, like extrusion blow molded (EBM) article or an injection stretch blow molded (ISBM) article, preferably comprising the propylene copolymer composition (P) as defined above in an amount of at least 75.0 wt.-%, more preferably at least 80.0 wt.-%, still more preferably at least 90.0 wt.-%, yet more preferably at least 95.0 wt.-%, still yet more preferably comprising at least 99.0 wt.-%, based on the total weight of the blow molded article, like of the extrusion blow molded (EBM) article or of the injection stretch blow molded (ISBM) article. In one embodiment of the instant invention, the blow molded article, like the extrusion blow molded (EBM) article or the injection stretch blow molded (ISBM) article, preferably consists of the propylene copolymer composition (P) as defined above.

The blow molded article is preferably an extrusion blow molded (EBM).

Accordingly, as the propylene copolymer composition (P) is the main component in the blow molded article, the blow molded article, like the extrusion blow molded (EBM) article or the injection stretch blow molded (ISBM) article, has preferably the same properties as the propylene copolymer composition (P). Accordingly, all properties mentioned for the propylene copolymer composition (P) are equally applicable for the blow molded article, like for the extrusion blow molded (EBM) article or for the injection stretch blow molded (ISBM) article. This applies in particular, but not only, for the melt flow rate MFR$_2$ (230° C.), the comonomer content, the DSC properties, like melting temperature, and the xylene cold soluble (XCS) content.

Preferably, the extrusion blow molded articles are bottles or containers, preferably bottles for household or industrial chemicals, for cosmetics, for pharmaceutical packaging, healthcare applications or for food and drinks. In one embodiment of the instant invention, the extrusion blow molded articles are bottles suitable for healthcare applications, like blow, fill and seal applications. It is preferred that the bottles have dimensions of up to 10 l, preferably 100 ml to 5 l, like 200 ml to 2 l, and/or a wall thickness of 0.1 to 1.2 mm, like 0.2 to 0.8 mm.

In one embodiment of the present invention, the (extrusion) blow molded article has a bottle appearance factor (BAF) before sterilization of in-equation (I), more preferably of in-equation (Ia), yet more preferably of in-equation (Ib), $$BAF > 65 \qquad (I),$$

$$65 < BAF \leq 200 \qquad (Ia),$$

$$68 < BAF \leq 160 \qquad (Ib)$$

wherein
BAF is defined as:

$$BAF = \frac{C \times G}{H}$$

wherein
H is the haze value
C is the clarity value,
G is the gloss value,
wherein further the haze, the clarity and the gloss are determined according to ASTM D 1003-07 on a test specimen cut from a bottle having a wall thickness of 0.3 mm made from propylene copolymer composition (P).

Additionally or alternatively, the (extrusion) blow molded article has a bottle appearance factor (BAF) after sterilization of in-equation (II), more preferably of in-equation (IIa), yet more preferably of in-equation (IIb), $$BAF > 125 \qquad (II),$$

$$125 < BAF \leq 450 \qquad (IIa),$$

$$200 < BAF \leq 400 \qquad (IIb)$$

wherein
BAF is defined as:

$$BAF = \frac{C \times G}{H}$$

wherein
H is the haze value
C is the clarity value,
G is the gloss value,
wherein further the haze, the clarity and the gloss are determined according to ASTM D 1003-07 on a test specimen cut from a bottle having a wall thickness of 0.3 mm made from propylene copolymer composition (P).

The preparation of extrusion blow molded (EBM) articles as well as of the injection stretch blow molded (ISBM) article are well known in the art and for instance described in "Propylene handbook", Nello Pasquinin (Ed.), 2$^{nd}$ edition (2005), page 445, Hanser.

In extrusion blow molding (EBM), the polymer is melted and extruded into a hollow tube (a parison). This parison is then captured by closing it into a cooled forming mold. Compressed air is then blown into the parison, inflating it into the shape of the hollow bottle, container, or part. After the polymer has cooled sufficiently, the mold is opened and the part is ejected.

The present invention is also directed to the use of the propylene copolymer composition (P) for the manufacture of an blow molded article, like of an extrusion blow molded (EBM) article or of an injection stretch blow molded (ISBM) article. The present invention is in particular directed to the use of the propylene copolymer composition (P) as defined above to improve the impact-stiffness-balance and/or the bottle appearance factor after sterilization of an blow molded article, preferably of an extrusion blow molded (EBM) article or of an injection stretch blow molded (ISBM) article like an extrusion blow molded bottle or extrusion blow molded container, comprising, preferably comprising at least 75.0 wt.-%, more preferably comprising at least 80.0 wt.-%, still more preferably comprising at least 90.0 wt.-%, yet more preferably comprising at least 95.0 wt.-%, still yet more preferably comprising at least 99.0 wt.-%, like consisting of, said propylene copolymer composition (P).

The improvement is especially accomplished when the (extrusion) blow molded article, like the extrusion blow molded bottle or extrusion blow molded container preferably comprising at least 75.0 wt.-%, more preferably at least 80.0 wt.-%, still more preferably at least 90.0 wt.-%, yet more preferably at least 95.0 wt.-%, still yet more preferably at least 99.0 wt.-%, like consisting of, said propylene copolymer composition (P) has
(a) a bottle appearance factor (BAF) before sterilization of in-equation (I), more preferably of in-equation (Ia), yet more preferably of in-equation (Ib), $$BAF > 65 \qquad (I),$$

$$65 < BAF \leq 200 \qquad (Ia),$$

$$68 < BAF \leq 160 \qquad (Ib)$$

and/or
(b) a bottle appearance factor (BAF) after sterilization of in-equation (II), more preferably of in-equation (IIa), yet more preferably of in-equation (IIb), $$BAF > 125 \qquad (II),$$

$$125 < BAF \leq 450 \qquad (IIa),$$

$$200 < BAF \leq 400 \qquad (IIb)$$

wherein
BAF is defined as:

$$BAF = \frac{C \times G}{H}$$

wherein
H is the haze value
C is the clarity value,
G is the gloss value,
wherein further
the haze, the clarity and the gloss are determined according to ASTM D 1003-07 on a test specimen cut from a bottle having a wall thickness of 0.3 mm made from propylene copolymer composition (P).

Additionally or alternatively, the improvement is accomplished when the (extrusion) blow molded article, like the extrusion blow molded bottle or extrusion blow molded container preferably comprising at least 70.0 wt.-%, more preferably at least 80.0 wt.-%, still more preferably at least 90.0 wt.-%, yet more preferably at least 95.0 wt.-%, still yet more preferably at least 99.0 wt.-%, like consisting of, said propylene copolymer composition (P) has an impact-stiffness-balance of in-equation (III), more preferably of in-equation (IIIa), yet more preferably of in-equation (IIIb), $$ISB > 2\,500 \tag{III}$$

$$2\,500 < ISB \le 4\,000 \tag{IIIa}$$

$$2\,750 < ISB \le 3\,500 \tag{IIIb}$$

wherein
ISB is defined as: ISB=drop height*tensile modulus.

Additionally, the present invention is directed to the preparation of the propylene copolymer composition (P) of the instant invention. Accordingly, the process for the preparation of a propylene copolymer composition (P) as defined above is a sequential polymerization process comprising at least two reactors connected in series, wherein said process comprises the steps of (A) polymerizing in a first reactor (R-1) being a slurry reactor (SR), preferably a loop reactor (LR), propylene and at least one $C_5$ to $C_{12}$ α-olefin, preferably 1-hexene, obtaining a propylene copolymer (A) as defined in the instant invention, (B) transferring said propylene copolymer (A) and unreacted comonomers of the first reactor in a second reactor (R-2) being a gas phase reactor (GPR-1), (C) feeding to said second reactor (R-2) propylene and at least one $C_5$ to $C_{12}$ α-olefin, (D) polymerizing in said second reactor (R-2) and in the presence of said first propylene copolymer (A) propylene and at least one $C_5$ to $C_{12}$ α-olefin obtaining a propylene copolymer (B) as defined in the instant invention, said propylene copolymer (A) and said propylene copolymer (B) form the propylene copolymer composition (P) as defined in the instant invention, wherein further
in the first reactor (R-1) and second reactor (R-2) the polymerization takes place in the presence of a solid catalyst system (SCS), said solid catalyst system (SCS) comprises
(i) a transition metal compound of formula (I)

wherein
"M" is zirconium (Zr) or hafnium (Hf),
each "X" is independently a monovalent anionic σ-ligand,
each "Cp'" is a cyclopentadienyl-type organic ligand independently selected from the group consisting of substituted cyclopentadienyl, substituted indenyl, substituted tetrahydroindenyl, and substituted or unsubstituted fluorenyl, said organic ligands coordinate to the transition metal (M),
"R" is a bivalent bridging group linking said organic ligands (Cp'),
"n" is 1 or 2, preferably 1, and
(ii) optionally a cocatalyst (Co) comprising an element (E) of group 13 of the periodic table (IUPAC), preferably a cocatalyst (Co) comprising a compound of Al.

Concerning the definition of the propylene copolymer composition (P), the propylene copolymer (A) and the propylene copolymer (B) it is referred to the definitions given above.

Due to the use of the catalyst system (SCS) in a sequential polymerization process the manufacture of the above defined propylene copolymer composition (P) is possible. In particular due to the preparation of a propylene copolymer, i.e. the propylene copolymer (A), in the first reactor (R-1) and the conveyance of said propylene copolymer and especially the conveyance of unreacted comonomers into the second reactor (R-2) it is possible to produce a propylene copolymer composition (P) with low comonomer content in a sequential polymerization process.

The term "sequential polymerization process" indicates that the propylene copolymer composition (P) is produced in at least two reactors connected in series. More precisely the "term sequential polymerization process" indicates in the present application that the polymer of the first reactor (R-1) is directly conveyed with unreacted comonomers to the second reactor (R-2). Accordingly decisive aspect of the present process is the preparation of the propylene copolymer composition (P) in two different reactors, wherein the reaction material of the first reactor (R-1) is directly conveyed to the second reactor (R-2). Thus the present process comprises at least a first reactor (R-1) and a second reactor (R-2). In one specific embodiment the instant process consists of two polymerization reactors (R-1) and (R-2). The term "polymerization reactor" shall indicate that the main polymerization takes place. Thus in case the process consists of two polymerization reactors, this definition does not exclude the option that the overall process comprises for instance a pre-polymerization step in a pre-polymerization reactor. The term "consists of" is only a closing formulation in view of the main polymerization reactors.

The first reactor (R-1) is preferably a slurry reactor (SR) and can be can be any continuous or simple stirred batch tank reactor or loop reactor operating in bulk or slurry. Bulk means a polymerization in a reaction medium that comprises of at least 60% (wt/wt), preferably 100% monomer. According to the present invention the slurry reactor (SR) is preferably a (bulk) loop reactor (LR).

The second reactor (R-2) and any subsequent reactor are preferably gas phase reactors (GPR). Such gas phase reactors (GPR) can be any mechanically mixed or fluid bed reactors. Preferably, the gas phase reactors (GPR) comprise a mechanically agitated fluid bed reactor with gas velocities of at least 0.2 m/sec. Thus, it is appreciated that the gas phase reactor is a fluidized bed type reactor preferably with a mechanical stirrer.

The condition (temperature, pressure, reaction time, monomer feed) in each reactor is dependent on the desired product which is in the knowledge of a person skilled in the art. As already indicated above, the first reactor (R-1) is preferably a slurry reactor (SR), like a loop reactor (LR), whereas the second reactor (R-2) is preferably a gas phase reactor (GPR-1). The subsequent reactors—if present—are also preferably gas phase reactors (GPR).

A preferred multistage process is a "loop-gas phase"-process, such as developed by Borealis A/S, Denmark (known as BORSTAR® technology) described e.g. in patent literature, such as in EP 0 887 379 or in WO 92/12182.

Multimodal polymers can be produced according to several processes which are described, e.g. in WO 92/12182, EP 0 887 379, and WO 98/58976. The contents of these documents are included herein by reference.

Preferably, in the instant process for producing the propylene copolymer composition (P) as defined above the conditions for the first reactor (R-1), i.e. the slurry reactor (SR), like a loop reactor (LR), of step (A) may be as follows:
the temperature is within the range of 40° C. to 110° C., preferably between 50° C. and 100° C., 60 to 90° C., the pressure is within the range of 20 bar to 80 bar, preferably between 40 bar to 70 bar, hydrogen can be added for controlling the molar mass in a manner known per se.

Subsequently, the reaction mixture from step (A) is transferred to the second reactor (R-2), i.e. gas phase reactor (GPR-1), i.e. to step (D), whereby the conditions in step (D) are preferably as follows:

the temperature is within the range of 50° C. to 130° C., preferably between 60° C. and 100° C., the pressure is within the range of 5 bar to 50 bar, preferably between 15 bar to 40 bar, hydrogen can be added for controlling the molar mass in a manner known per se.

The residence time can vary in both reactor zones.

In one embodiment of the process for the preparation of the propylene copolymer composition (P), the residence time in bulk reactor, e.g. loop is in the range 0.2 to 4 hours, e.g. 0.3 to 1.5 hours and the residence time in gas phase reactor will generally be 0.2 to 6.0 hours, like 0.5 to 4.0 hours.

If desired, the polymerization may be effected in a known manner under supercritical conditions in the first reactor (R-1), i.e. in the slurry reactor (SR), like in the loop reactor (LR), and/or as a condensed mode in the gas phase reactor (GPR-1).

The conditions in the other gas phase reactors (GPR), if present, are similar to the second reactor (R-2).

The present process may also encompass a pre-polymerization prior to the polymerization in the first reactor (R-1). The pre-polymerization can be conducted in the first reactor (R-1), however it is preferred that the pre-polymerization takes place in a separate reactor, so called pre-polymerization reactor.

In one specific embodiment the solid catalyst system (SCS) has a porosity measured according ASTM 4641 of less than 1.40 ml/g and/or a surface area measured according to ASTM D 3663 of lower than 25 m²/g.

Preferably, the solid catalyst system (SCS) has a surface area of lower than 15 m²/g, yet still lower than 10 m²/g and most preferred lower than 5 m²/g, which is the lowest measurement limit. The surface area according to this invention is measured according to ASTM D 3663 (N₂).

Alternatively or additionally, it is appreciated that the solid catalyst system (SCS) has a porosity of less than 1.30 ml/g and more preferably less than 1.00 ml/g. The porosity has been measured according to ASTM 4641 (N₂). In another preferred embodiment the porosity is not detectable when determined with the method applied according to ASTM 4641 (N₂).

Furthermore, the solid catalyst system (SCS) typically has a mean particle size of not more than 500 µm, i.e. preferably in the range of 2 to 500 µm, more preferably 5 to 200 µm. It is in particular preferred that the mean particle size is below 80 µm, still more preferably below 70 µm. A preferred range for the mean particle size is 5 to 70 µm, or even 10 to 60 µm.

As stated above, the transition metal (M) is zirconium (Zr) or hafnium (Hf), preferably zirconium (Zr).

The term "σ-ligand" is understood in the whole description in a known manner, i.e. a group bound to the metal via a sigma bond. Thus, the anionic ligands "X" can independently be halogen or be selected from the group consisting of R', OR', SiR'₃, OSiR'₃, OSO₂CF₃, OCOR', SR', NR'₂ or PR'₂ group wherein R' is independently hydrogen, a linear or branched, cyclic or acyclic, $C_1$ to $C_{20}$ alkyl, $C_2$ to $C_{20}$ alkenyl, $C_2$ to $C_{20}$ alkynyl, $C_3$ to $C_{12}$ cycloalkyl, $C_6$ to $C_{20}$ aryl, $C_7$ to $C_{20}$ arylalkyl, $C_7$ to $C_{20}$ alkylaryl, $C_8$ to $C_{20}$ arylalkenyl, in which the R' group can optionally contain one or more heteroatoms belonging to groups 14 to 16. In a preferred embodiments the anionic ligands "X" are identical and either halogen, like Cl, or methyl or benzyl.

A preferred monovalent anionic ligand is halogen, in particular chlorine (Cl).

The substituted cyclopentadienyl-type ligand(s) may have one or more substituent(s) being selected from the group consisting of halogen, hydrocarbyl (e.g. $C_1$ to $C_{20}$ alkyl, $C_2$ to $C_{20}$ alkenyl, $C_2$ to $C_{20}$ alkynyl, $C_3$ to $C_{20}$ cycloalkyl, like $C_1$ to $C_{20}$ alkyl substituted $C_5$ to $C_{20}$ cycloalkyl, $C_6$ to $C_{20}$ aryl, $C_5$ to $C_{20}$ cycloalkyl substituted $C_1$ to $C_{20}$ alkyl wherein the cycloalkyl residue is substituted by $C_1$ to $C_{20}$ alkyl, $C_7$ to $C_{20}$ arylalkyl, $C_3$ to $C_{12}$ cycloalkyl which contains 1, 2, 3 or 4 heteroatom(s) in the ring moiety, $C_6$ to $C_{20}$-heteroaryl, $C_1$ to $C_{20}$-haloalkyl, —SiR"₃, —SR", —PR"₂ or —NR"₂, each R" is independently a hydrogen or hydrocarbyl (e.g. $C_1$ to $C_{20}$ alkyl, $C_1$ to $C_{20}$ alkenyl, $C_2$ to $C_{20}$ alkynyl, $C_3$ to $C_{12}$ cycloalkyl, or $C_6$ to $C_{20}$ aryl) or e.g. in case of —NR"₂, the two substituents R" can form a ring, e.g. five- or six-membered ring, together with the nitrogen atom wherein they are attached to.

Further "R" of formula (I) is preferably a bridge of 1 to 4 atoms, such atoms being independently carbon (C), silicon (Si), germanium (Ge) or oxygen (O) atom(s), whereby each of the bridge atoms may bear independently substituents, such as $C_1$ to $C_{20}$-hydrocarbyl, tri($C_1$ to $C_{20}$-alkyl)silyl, tri($C_1$ to $C_{20}$-alkyl)siloxy and more preferably "R" is a one atom bridge like e.g. —SiR'''₂—, wherein each R''' is independently $C_1$ to $C_{20}$-alkyl, $C_2$ to $C_{20}$-alkenyl, $C_2$ to $C_{20}$-alkynyl, $C_3$ to $C_{12}$ cycloalkyl, $C_6$ to $C_{20}$-aryl, alkylaryl or arylalkyl, or tri($C_1$ to $C_{20}$ alkyl)silyl- residue, such as trimethylsilyl-, or the two R''' can be part of a ring system including the Si bridging atom.

In a preferred embodiment the transition metal compound has the formula (II)

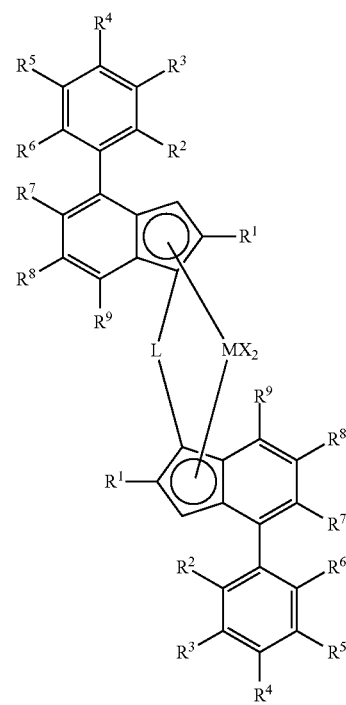

wherein

M is zirconium (Zr) or hafnium (Hf), preferably zirconium (Zr),

X are ligands with a 6-bond to the metal "M", preferably those as defined above for formula (I),
preferably chlorine (Cl) or methyl ($CH_3$), the former especially preferred, $R^1$ are equal to or different from each other, preferably equal to, and are selected from the group consisting of linear saturated $C_1$ to $C_{20}$ alkyl, linear unsaturated $C_1$ to $C_{20}$ alkyl, branched saturated $C_1$-$C_{20}$ alkyl, branched unsaturated $C_1$ to $C_{20}$ alkyl, $C_3$ to $C_{20}$ cycloalkyl, $C_6$ to $C_{20}$ aryl, $C_7$ to $C_{20}$ alkylaryl, and $C_7$ to $C_{20}$ arylalkyl, optionally containing one or more heteroatoms of groups 14 to 16 of the Periodic Table (IUPAC), preferably are equal to or different from each other, preferably equal to, and are $C_1$ to $C_{10}$ linear or branched hydrocarbyl, more preferably are equal to or different from each other, preferably equal to, and are $C_1$ to $C_6$ linear or branched alkyl, $R^2$ to $R^6$ are equal to or different from each other and are selected from the group consisting of hydrogen, linear saturated $C_1$-$C_{20}$ alkyl, linear unsaturated $C_1$-$C_{20}$ alkyl, branched saturated $C_1$-$C_{20}$ alkyl, branched unsaturated $C_1$-$C_{20}$ alkyl, $C_3$-$C_{20}$ cycloalkyl, $C_6$-$C_{20}$ aryl, $C_7$-$C_{20}$ alkylaryl, and $C_7$-$C_{20}$ arylalkyl, optionally containing one or more heteroatoms of groups 14 to 16 of the Periodic Table (IUPAC),
preferably are equal to or different from each other and are $C_1$ to $C_{10}$ linear or branched hydrocarbyl, more preferably are equal to or different from each other and are $C_1$ to $C_6$ linear or branched alkyl, $R^7$ and $R^8$ are equal to or different from each other and selected from the group consisting of hydrogen, linear saturated $C_1$ to $C_{20}$ alkyl, linear unsaturated $C_1$ to $C_{20}$ alkyl, branched saturated $C_1$ to $C_{20}$ alkyl, branched unsaturated $C_1$ to $C_{20}$ alkyl, $C_3$ to $C_{20}$ cycloalkyl, $C_6$ to $C_{20}$ aryl, $C_7$ to $C_{20}$ alkylaryl, $C_7$ to $C_{20}$ arylalkyl, optionally containing one or more heteroatoms of groups 14 to 16 of the Periodic Table (IUPAC), $SiR^{10}_3$, $GeR^{10}_3$, $OR^{10}$, $SR^{10}$ and $NR^{10}_2$,
wherein $R^{10}$ is selected from the group consisting of linear saturated $C_1$-$C_{20}$ alkyl, linear unsaturated $C_1$ to $C_{20}$ alkyl, branched saturated $C_1$ to $C_{20}$ alkyl, branched unsaturated $C_1$ to $C_{20}$ alkyl, $C_3$ to $C_{20}$ cycloalkyl, $C_6$ to $C_{20}$ aryl, $C_7$ to $C_{20}$ alkylaryl, and $C_7$ to $C_{20}$ arylalkyl, optionally containing one or more heteroatoms of groups 14 to 16 of the Periodic Table (IUPAC),
and/or $R^7$ and $R^8$ being optionally part of a $C_4$ to $C_{20}$ carbon ring system together with the indenyl carbons to which they are attached, preferably a $C_5$ ring, optionally one carbon atom can be substituted by a nitrogen, sulfur or oxygen atom, $R^9$ are equal to or different from each other and are selected from the group consisting of hydrogen, linear saturated $C_1$ to $C_{20}$ alkyl, linear unsaturated $C_1$ to $C_{20}$ alkyl, branched saturated $C_1$ to $C_{20}$ alkyl, branched unsaturated $C_1$ to $C_{20}$ alkyl, $C_3$ to $C_{20}$ cycloalkyl, $C_6$ to $C_{20}$ aryl, $C_7$ to $C_{20}$ alkylaryl, $C_7$ to $C_{20}$ arylalkyl, $OR^{10}$, and $SR^{10}$,
preferably $R^9$ are equal to or different from each other and are H or $CH_3$,
wherein
$R^{10}$ is defined as before, L is a bivalent group bridging the two indenyl ligands, preferably being a $C_2R^{11}_4$ unit or a $SiR^{11}_2$ or $GeR^{11}_2$, wherein, $R^{11}$ is selected from the group consisting of H, linear saturated $C_1$ to $C_{20}$ alkyl, linear unsaturated $C_1$ to $C_{20}$ alkyl, branched saturated $C_1$ to $C_{20}$ alkyl, branched unsaturated $C_1$ to $C_{20}$ alkyl, $C_3$ to $C_{20}$ cycloalkyl, $C_6$ to $C_{20}$ aryl, $C_7$ to $C_{20}$ alkylaryl or $C_7$ to $C_{20}$ arylalkyl, optionally containing one or more heteroatoms of groups 14 to 16 of the Periodic Table (IUPAC),
preferably $Si(CH_3)_2$, $SiCH_3C_6H_{11}$, or $SiPh_2$,
wherein $C_6H_{11}$ is cyclohexyl.

Preferably, the transition metal compound of formula (II) is $C_2$-symmetric or pseudo-$C_2$-symmetric. Concerning the definition of symmetry it is referred to Resconi et al. Chemical Reviews, 2000, Vol. 100, No. 4 1263 and references herein cited.

Preferably, the residues $R^1$ are equal to or different from each other, more preferably equal, and are selected from the group consisting of linear saturated $C_1$ to $C_{10}$ alkyl, linear unsaturated $C_1$ to $C_{10}$ alkyl, branched saturated $C_1$ to $C_{10}$ alkyl, branched unsaturated $C_1$ to $C_{10}$ alkyl and $C_7$ to $C_{12}$ arylalkyl. Even more preferably the residues $R^1$ are equal to or different from each other, more preferably equal, and are selected from the group consisting of linear saturated $C_1$ to $C_6$ alkyl, linear unsaturated $C_1$ to $C_6$ alkyl, branched saturated $C_1$ to $C_6$ alkyl, branched unsaturated $C_1$ to $C_6$ alkyl and $C_7$ to $C_{10}$ arylalkyl. Yet more preferably the residues $R^1$ are equal to or different from each other, more preferably equal, and are selected from the group consisting of linear or branched $C_1$ to $C_4$ hydrocarbyl, such as for example methyl or ethyl.

Preferably, the residues $R^2$ to $R^6$ are equal to or different from each other and linear saturated $C_1$ to $C_4$ alkyl or branched saturated $C_1$ to $C_4$ alkyl. Even more preferably the residues $R^2$ to $R^6$ are equal to or different from each other, more preferably equal, and are selected from the group consisting of methyl, ethyl, iso-propyl and tert-butyl.

Preferably, $R^7$ and $R^8$ are equal to or different from each other and are selected from hydrogen and methyl, or they are part of a 5-methylene ring including the two indenyl ring carbons to which they are attached. In another preferred embodiment, $R^7$ is selected from $OCH_3$ and $OC_2H_5$, and $R^8$ is tert-butyl.

In a preferred embodiment the transition metal compound is rac-methyl(cyclohexyl)silanediyl bis(2-methyl-4-(4-tert-butylphenyl)indenyl)zirconium dichloride.

In a second preferred embodiment, the transition metal compound is rac-dimethylsilanediyl bis(2-methyl-4-phenyl-1,5,6,7-tetrahydro-s-indacen-1-yl)zirconium dichloride.

In a third preferred embodiment, the transition metal compound is rac-dimethylsilanediyl bis(2-methyl-4-phenyl-5-methoxy-6-tert-butylindenyl)zirconium dichloride.

As a further requirement the solid catalyst system (SCS) according to this invention must comprise a cocatalyst (Co) comprising an element (E) of group 13 of the periodic table (IUPAC), for instance the cocatalyst (Co) comprises a compound of Al.

Examples of such cocatalyst (Co) are organo aluminium compounds, such as aluminoxane compounds.

Such compounds of Al, preferably aluminoxanes, can be used as the only compound in the cocatalyst (Co) or together with other cocatalyst compound(s). Thus besides or in addition to the compounds of Al, i.e. the aluminoxanes, other cation complex forming cocatalyst compounds, like boron compounds can be used. Said cocatalysts are commercially available or can be prepared according to the prior art literature. Preferably however in the manufacture of the solid catalyst system only compounds of Al as cocatalyst (Co) are employed.

In particular preferred cocatalysts (Co) are the aluminoxanes, in particular the C1 to C10-alkylaluminoxanes, most particularly methylaluminoxane (MAO).

Preferably, the organo-zirconium compound of formula (I) and the cocatalyst (Co) of the solid catalyst system (SCS) represent at least 70 wt %, more preferably at least 80 wt %, even more preferably at least 90 wt %, even further preferably at least 95 wt % of the solid catalyst system. Thus it is appreciated that the solid catalyst system is featured by the fact that it is self-supported, i.e. it does not comprise any catalytically inert support material, like for instance silica, alumina or $MgCl_2$ or porous polymeric material, which is otherwise commonly used in heterogeneous catalyst systems, i.e. the catalyst is not supported on external support or carrier material. As a consequence of that the solid catalyst system (SCS) is self-supported and it has a rather low surface area.

In one embodiment the solid metallocene catalyst system (SCS) is obtained by the emulsion solidification technology, the basic principles of which are described in WO 03/051934. This document is herewith included in its entirety by reference.

Hence the solid catalyst system (SCS) is preferably in the form of solid catalyst particles, obtainable by a process comprising the steps of a) preparing a solution of one or more catalyst components;
b) dispersing said solution in a second solvent to form an emulsion in which said one or more catalyst components are present in the droplets of the dispersed phase,
c) solidifying said dispersed phase to convert said droplets to solid particles and optionally recovering said particles to obtain said catalyst.

Preferably, a first solvent, more preferably a first organic solvent, is used to form said solution. Still more preferably the organic solvent is selected from the group consisting of a linear alkane, cyclic alkane, aromatic hydrocarbon and halogen-containing hydrocarbon.

Moreover, the second solvent forming the continuous phase is an inert solvent towards to catalyst components, The second solvent might be immiscible towards the solution of the catalyst components at least under the conditions (like temperature) during the dispersing step. The term "immiscible with the catalyst solution" means that the second solvent (continuous phase) is fully immiscible or partly immiscible i.e. not fully miscible with the dispersed phase solution.

Preferably, the immiscible solvent comprises a fluorinated organic solvent and/or a functionalized derivative thereof, still more preferably the immiscible solvent comprises a semi-, highly- or perfluorinated hydrocarbon and/or a functionalized derivative thereof. It is in particular preferred, that said immiscible solvent comprises a perfluorohydrocarbon or a functionalized derivative thereof, preferably $C_3$-$C_{30}$ perfluoroalkanes, -alkenes or -cycloalkanes, more preferred $C_4$-$C_{10}$ perfluoro-alkanes, -alkenes or -cycloalkanes, particularly preferred perfluorohexane, perfluoroheptane, perfluorooctane or perfluoro (methylcyclohexane) or perfluoro (1,3-dimethylcyclohexane) or a mixture thereof.

Furthermore, it is preferred that the emulsion comprising said continuous phase and said dispersed phase is a bi- or multiphasic system as known in the art. An emulsifier may be used for forming and stabilising the emulsion. After the formation of the emulsion system, said catalyst is formed in situ from catalyst components in said solution.

In principle, the emulsifying agent may be any suitable agent which contributes to the formation and/or stabilization of the emulsion and which does not have any adverse effect on the catalytic activity of the catalyst. The emulsifying agent may e.g. be a surfactant based on hydrocarbons optionally interrupted with (a) heteroatom(s), preferably halogenated hydrocarbons optionally having a functional group, preferably semi-, highly- or perfluorinated hydrocarbons as known in the art. Alternatively, the emulsifying agent may be prepared during the emulsion preparation, e.g. by reacting a surfactant precursor with a compound of the catalyst solution. Said surfactant precursor may be a halogenated hydrocarbon with at least one functional group, e.g. a highly fluorinated C1-n (suitably C4-30- or C5-15) alcohol (e.g. highly fluorinated heptanol, octanol or nonanol), oxide (e.g. propenoxide) or acrylate ester which reacts e.g. with a cocatalyst component, such as aluminoxane to form the "actual" surfactant.

In principle, any solidification method can be used for forming the solid particles from the dispersed droplets. According to one preferable embodiment, the solidification is effected by a temperature change treatment. Hence the emulsion subjected to gradual temperature change of up to 10° C./min, preferably 0.5 to 6° C./min and more preferably 1 to 5° C./min. Even more preferred the emulsion is subjected to a temperature change of more than 40° C., preferably more than 50° C. within less than 10 seconds, preferably less than 6 seconds.

For further details, embodiments and examples of the continuous and dispersed phase system, emulsion formation method, emulsifying agent and solidification methods reference is made e.g. to the above cited international patent application WO 03/051934.

All or part of the preparation steps can be done in a continuous manner Reference is made to WO 2006/069733 describing principles of such a continuous or semicontinuous preparation methods of the solid catalyst types, prepared via emulsion/solidification method.

The above described catalyst components are prepared according to the methods described in WO 01/48034.

In the following, the present invention is described by way of examples.

EXAMPLES

A. Measuring Methods

The following definitions of terms and determination methods apply for the above general description of the invention as well as to the below examples unless otherwise defined.

Quantification of Microstructure by NMR Spectroscopy

Quantitative nuclear-magnetic resonance (NMR) spectroscopy was used to quantify the isotacticity, regio-regularity and comonomer content of the polymers.

Quantitative $^{13}C$ {$^{1}H$} NMR spectra recorded in the molten-state using a Bruker Advance III 500 NMR spectrometer operating at 500.13 and 125.76 MHz for $^{1}H$ and $^{13}C$ respectively. All spectra were recorded using a $^{13}C$ optimised 7 mm magic-angle spinning (MAS) probehead at 180° C. using nitrogen gas for all pneumatics. Approximately 200 mg of material was packed into a 7 mm outer diameter zirconia MAS rotor and spun at 4 kHz. Standard single-pulse excitation was employed utilising the NOE at short recycle delays (as described in Pollard, M., Klimke, K., Graf, R., Spiess, H. W., Wilhelm, M., Sperber, O., Piel, C., Kaminsky, W., Macromolecules 2004, 37, 813, and in Klimke, K., Parkinson, M., Piel, C., Kaminsky, W., Spiess, H. W., Wilhelm, M., Macromol. Chem. Phys. 2006, 207, 382) and the RS-HEPT decoupling scheme (as described in Filip, X., Tripon, C., Filip, C., J. Mag. Resn. 2005, 176, 239, and in Griffin, J. M., Tripon, C., Samoson, A., Filip, C., and Brown, S. P., Mag. Res. in Chem. 2007, 45, S1, S198). A total of 1024 (1 k) transients were acquired per spectra.

Quantitative $^{13}C\{^1H\}$ NMR spectra were processed, integrated and relevant quantitative properties determined from the integrals. All chemical shifts are internally referenced to the methyl isotactic pentad (mmmm) at 21.85 ppm.

The tacticity distribution was quantified through integration of the methyl region in the $^{13}C\{^1H\}$ spectra, correcting for any signal not related to the primary (1,2) inserted propene stereo sequences, as described in Busico, V., Cipullo, R., Prog. Polym. Sci. 2001, 26, 443 and in Busico, V., Cipullo, R., Monaco, G., Vacatello, M., Segre, A. L., Macromolecules 1997, 30, 6251.

Characteristic signals corresponding to regio defects were observed (Resconi, L., Cavallo, L., Fait, A., Piemontesi, F., Chem. Rev. 2000, 100, 1253). The influence of regio defects on the quantification of the tacticity distribution was corrected for by subtraction of representative regio defect integrals from specific integrals of the stereo sequences. The isotacticity was determined at the triad level and reported as the percentage of isotactic triad mm with respect to all triad sequences:

% $mm = (mm/(mm+mr+rr))*100$

Characteristic signals corresponding to the incorporation of 1-hexene were observed, and the 1-hexene content was calculated as the mole percent of 1-hexene in the polymer, H(mol %), according to:

$[H] = H_{tot}/(P_{tot}+H_{tot})$ where:

$H_{tot} = I(\alpha B_4)/2 + I(\alpha\alpha B_4) \times 2$ where $I(\alpha B_4)$ is the integral of the $\alpha B_4$ sites at 44.1 ppm, which identifies the isolated 1-hexene incorporated in PPHPP sequences, and $I(\alpha\alpha B_4)$ is the integral of the $\alpha\alpha B_4$ sites at 41.6 ppm, which identifies the consecutively incorporated 1-hexene in PPHHPP sequences.

$P_{tot}$=Integral of all CH3 areas on the methyl region with correction applied for underestimation of other propene units not accounted for in this region and overestimation due to other sites found in this region.

and $H$(mol %)=100×[H].

A statistical distribution is suggested from the relationship between the content of hexene present in isolated (PPHPP) and consecutive (PPHHPP) incorporated comonomer sequences:

$[HH] < [H]^2$

Calculation of comonomer content of the propylene copolymer (B):

$$\frac{C(P) - w(A) \times C(A)}{w(B)} = C(B) \quad (I)$$

wherein
w(A) is the weight fraction [in wt.-%] of the propylene copolymer (A),
w(B) is the weight fraction [in wt.-%] of the propylene copolymer (B),
C(A) is the comonomer content [in mol-%] of the propylene copolymer (A),
C(P) is the comonomer content [in mol-%] of the propylene copolymer composition (P),
C(B) is the calculated comonomer content [in mol-%] of the propylene copolymer (B).

Melt Flow Rate (MFR)

The melt flow rates are measured with a load of 2.16 kg (MFR$_2$) at 230° C. The melt flow rate is that quantity of polymer in grams which the test apparatus standardised to ISO 1133 extrudes within 10 minutes at a temperature of 230° C. under a load of 2.16 kg. Calculation of melt flow rate MFR$_2$ (230° C.) of the propylene copolymer (B):

$$MFR(B) = 10^{\left[\frac{\log(MFR(P)) - w(A) \times \log(MFR(A))}{w(B)}\right]}$$

wherein
w(A) is the weight fraction of the propylene copolymer (A),
w(B) is the weight fraction of the propylene copolymer (B),
MFR(A) is the melt flow rate MFR$_2$ (230° C.) [in g/10 min] measured according ISO 1133 of the polypropylene (A),
MFR(P) is the melt flow rate MFR$_2$ (230° C.) [in g/10 min] measured according ISO 1133 of the propylene copolymer composition (P),
MFR(B) is the calculated melt flow rate MFR$_2$ (230° C.) [in g/10 min] of the propylene copolymer (B).

Xylene Cold Soluble Fraction (XCS wt.-%)

The xylene cold soluble fraction (XCS) is determined at 23° C. according to ISO 6427. Calculation of the xylene cold soluble (XCS) content of the propylene copolymer (B):

$$\frac{XS(P) - w(A) \times XS(A)}{w(B)} = XS(B) \quad (II)$$

wherein
w(A) is the weight fraction [in wt.-%] of the propylene copolymer (A),
w(B) is the weight fraction [in wt.-%] of the propylene copolymer (B),
XS(A) is the xylene cold soluble (XCS) content [in wt.-%] of the propylene copolymer (A),
XS(P) is the xylene cold soluble (XCS) content [in wt.-%] of the propylene copolymer composition (P),
XS(B) is the calculated xylene cold soluble (XCS) content [in wt.-%] of the propylene copolymer (B), respectively.

Porosity:
BET with N$_2$ gas, ASTM 4641, apparatus Micromeritics Tristar 3000; sample preparation: at a temperature of 50° C., 6 hours in vacuum.

Hexane Solubles
FDA section 177.1520
1 g of a polymer film of 100 μm thickness is added to 400 ml hexane at 50° C. for 2 hours while stirring with a reflux cooler.
After 2 hours the mixture is immediately filtered on a filter paper No. 41.
The precipitate is collected in an aluminium recipient and the residual hexane is evaporated on a steam bath under N$_2$ flow.
The amount of hexane solubles is determined by the formula ((wt. sample+wt. crucible)−(wt. crucible))/(wt. sample)·100.

Melting temperature T$_m$, crystallization temperature T$_c$, is measured with Mettler TA820 differential scanning calorimetry (DSC) on 5-10 mg samples. Both crystallization and melting curves were obtained during 10° C./min cooling and heating scans between 30° C. and 225° C. Melting and crystallization temperatures were taken as the peaks of endotherms and exotherms.

Also the melt- and crystallization enthalpy (Hm and Hc) were measured by the DSC method according to ISO 11357-3.

Number Average Molecular Weight ($M_n$), Weight Average Molecular Weight ($M_w$) and Polydispersity (Mw/Mn) are determined by Gel Permeation Chromatography (GPC) according to the following method:

The weight average molecular weight Mw and the polydispersity (Mw/Mn), wherein Mn is the number average molecular weight and Mw is the weight average molecular weight) is measured by a method based on ISO 16014-1: 2003 and ISO 16014-4:2003. A Waters Alliance GPCV 2000 instrument, equipped with refractive index detector and online viscosimeter was used with 3×TSK-gel columns (GMHXL-HT) from TosoHaas and 1,2,4-trichlorobenzene (TCB, stabilized with 200 mg/L 2,6-Di tert butyl-4-methylphenol) as solvent at 145° C. and at a constant flow rate of 1 mL/min. 216.5 µL of sample solution were injected per analysis. The column set was calibrated using relative calibration with 19 narrow MWD polystyrene (PS) standards in the range of 0.5 kg/mol to 11 500 kg/mol and a set of well characterized broad polypropylene standards. All samples were prepared by dissolving 5-10 mg of polymer in 10 mL (at 160° C.) of stabilized TCB (same as mobile phase) and keeping for 3 hours with continuous shaking prior sampling in into the GPC instrument.

Surface Area:

BET with $N_2$ gas ASTM D 3663, apparatus Micromeritics Tristar 3000: sample preparation at a temperature of 50° C., 6 hours in vacuum.

Flexural Modulus:

The flexural modulus was determined in 3-point-bending at 23° C. according to ISO 178 on 80×10×4 mm³ test bars injection moulded in line with EN ISO 1873-2

Description/Dimension and Production of the Bottles:

1 l bottles, having an outer diameter of 90 mm, a wall thickness of 0.3 or 0.6 mm, an overall-height of 204 mm and a height of the cylindrical mantle of 185 mm were produced by extrusion blow molding on a B&W machine with a single screw extruder using a melt temperature of 210° C. and a mold temperature of 15° C., if not otherwise indicated.

Tensile Test on Bottles

The top and bottom of the bottles is cut off 12 specimen according to ISO527/1B are punched along the remaining cylinder. Tensile modulus and tensile stress are then determined according to ISO 527-2, applying a traction speed of 1 mm/min for the modulus and 100 mm/min for yield strength.

Transparency, Clarity, and Haze Measurement on Bottles:

Instrument: Haze-gard plus from BYK-Gardner

Testing: according to ASTM D1003 (as for injection molded plates)

Method: The measurement is done on the outer wall of the bottles. The top and bottom of the bottles are cut off. The resulting round wall is then split in two, horizontally. Then from this wall six equal samples of app. 60×60 mm are cut from close to the middle. The specimens are placed into the instrument with their convex side facing the haze port. Then the transparency, haze and clarity are measured for each of the six samples and the haze value is reported as the average of these six parallels.

Gloss Measurement on Bottles:

Instrument: Screen TRI-MICROGLOSS 20-60-80 from BYK-Gardner 20

Testing: ASTM D 2457 (as for injection molded plates)

The bottles: It is measured on the wall of the bottles. The top and bottom of the bottles is cut off. This round wall is then split in two, horizontally. Then this wall is cut into six equal samples of app. 90×90 mm, just to fit into a special light trap made for testing on injection molded parts. Then the gloss at 20° is measured on these six samples, and the average value is reported as gloss at 20°.

Drop Test on Bottles

The drop test is performed on the extrusion blow molded 1 l bottles as described before according to ASTM D2463-10b, procedure B The bottles are filled up to their shoulder with water.

During a pre-test the estimated falling height is determined on 10 bottles.

The final test is to be performed on 20 bottles, starting at the pre-determined falling height.

For each run 2 bottles are dropped.

Depending on 2 breaks or 1 break/1 no-break (=neutral) or 2 no-breaks, the next dropping height is chosen to be lower/same/higher for the next round.

The increase or decrease in height is 0.25 m, only at dropping heights <1.5 m the increase or decrease is 0.1 m.

The final drop height is determined depending on the falling heights of the containers after the first change in trend or after the first "neutral" result according following formula:

$$he = \Sigma(ni.hi)/ng$$

wherein
he=50% drop height
hi=drop height
ni=number of containers dropped at the respective height
ng=total number of dropped containers Steam sterilization was performed in a Systec D series machine (Systec Inc., USA). The samples were heated up at a heating rate of 5° C./min starting from 23° C. After having been kept for 30 min at 121° C., they were removed immediately from the steam sterilizer and stored at room temperature till processed further.

B. Examples

The propylene copolymer composition of table 1 has been produced in a Borstar PP pilot plant in a two-step polymerization process starting in a bulk-phase loop reactor followed by polymerization in a gas phase reactor. The catalyst used in the polymerization process was a metallocene catalyst as described in example 1 of EP 1 741 725 A1.

TABLE 1

Preparation of the example IE

|  |  | IE |
|---|---|---|
| Catalyst |  |  |
| Temperature | (° C.) | 20.8 |
| Residence time | (h) | 0.31 |
| Loop |  |  |
| Temperature | (° C.) | 65.0 |
| H2/C3 ratio | [mol/kmol] | 0.01 |
| C3/C6 ratio | [mol/kmol] | 9.1 |
| $MFR_2$ | [g/10 min] | 0.7 |
| C6 | [mol-%] | 0.7 |
| XCS | [wt.-%] | 2.5 |

TABLE 1-continued

Preparation of the example IE

| | | IE |
|---|---|---|
| GPR | | |
| Temperature | (° C.) | 85.0 |
| H2/C3 ratio | [mol/kmol] | 0.5 |
| C6/C3 ratio | [mol/kmol] | 0.4 |
| MFR$_2$ of copo B | [g/10 min] | 5.8 |
| C6 of copo B | [mol-%] | 2.6 |
| XCS of copo B | [wt.-%] | 1.1 |
| Split Loop/GPR | [%] | 46/54 |
| FINAL | | |
| C6 | [mol-%] | 1.7 |
| XCS | [wt.-%] | 1.7 |
| MFR$_2$ | [g/10 min] | 2.2 |
| Mw | kg/mol | 265 |
| MWD | [—] | 2.8 |
| Tm | [° C.] | 137.3 |
| Tc | [° C.] | 95.6 |

Loop defines the propylene copolymer (A)
GPR defines the propylene copolymer (B)
Final defines the propylene copolymer composition (P)
C6 is 1-hexene content As can be gathered from Table 1, a propylene copolymer composition having a bimodal C6 distribution of 0.7 mol-% after the loop and 1.7 mol-% after GPR1 and an MFR$_2$ of 2.2 was produced and subsequently used in an EBM process without nucleation.

Table 2 shows the EBM bottle production data and the performance of the produced bottles. The inventive example IE1 was successfully processed at very low melt temperatures of 180° C. and below without any melt-fracture problems.

TABLE 2

EBM bottle production data and properties of the examples

| | | IE 1 | CE 1 | CE 2 |
|---|---|---|---|---|
| MFR$_2$ | [g/10 min] | 2.2 | 1.9 | 1.9 |
| Comonomer content via NMR | [mol-%] | 1.7 (C6) | 7.0 (C2) | 5.6 (C2) |
| Nucleation | | no | no | yes |
| Melt temperature | [° C.] | 178 | 197 | 198 |
| Screw speed | [m/s] | 15.0 | 13.2 | 14.0 |
| Die pressure | [bar] | 81 | 72 | 72 |

TABLE 2-continued

EBM bottle production data and properties of the examples

| | | IE 1 | CE 1 | CE 2 |
|---|---|---|---|---|
| EBM bottle wall thickness | [mm] | 0.6 | 0.6 | 0.6 |
| Drop height | [m] | 4.55 | 3.48 | 2.03 |
| Tensile modulus | [MPa] | 719 | 515 | 1219 |
| ISB | [—] | 3271 | 1792 | 2475 |
| Gloss | [%] | 16.9 | 18.5 | 17.3 |
| Clarity | [%] | 67.2 | 67.4 | 76.7 |
| Haze | [%] | 36.2 | 46.8 | 30.9 |
| BAF | [—] | 31 | 27 | 43 |

BAF Bottle Appearance Factor (BAF = Gloss * Clarity/Haze)
ISB Impact-Stiffness-Balance (ISB = Drop height * Tens. Mod)

CE1 is the commercial grade RB801CF-01 available from Borealis A G, Austria and is an unnucleated propylene-ethylene random copolymer having a melting temperature of 140° C. and a MFR$_2$ (230° C.) of 1.9 g/10 min.

CE2 is the commercial grade RB206MO-06 available from Borealis A G, Austria and is an α-nucleated propylene-ethylene random copolymer having a melting temperature of 145° C. and a MFR$_2$ (230° C.) of 1.9 g/10 min.

Surprisingly, although inventive example IE1 had a rather low comonomer content of only 1.6 mol-% C6, it showed an excellent impact-stiffness-balance (ISB=drop height*tensile modulus). In particular, the stiffness was as expected for a low comonomer random copolymer, but the impact strength measured via the drop height was much higher than expected. Compared to the comparative propylene-ethylene random copolymer CE1 having 7 mol-% C2 content, not only the ISB but also the optical properties (summarised by the bottle appearance factor BAF) were found to be improved. One way to improve both the stiffness and the optical properties of a propylene copolymer composition is by reducing the comonomer content and using a clarifier. CE2, a nucleated propylene-ethylene random copolymer having 5.6 mol-% of C2 shows indeed a higher stiffness and a higher BAF compared to IE1, but also a much lower drop height. Hence, the best balance of properties is shown by IE1. An additional benefit of the inventive example IE is the high purity (less oligomers and migrating substances) usually found in materials prepared in the presence of metallocene catalysts.

Furthermore, Table 3 outlines the bottle performance of the inventive Example IE1 and comparative examples CE3 to CE5 before and after sterilization.

TABLE 3

EBM bottle production data and properties of the examples

| | | IE 1 | CE 3 | CE 4 | CE 5 |
|---|---|---|---|---|---|
| MFR$_2$ | [g/10 min] | 2.2 | 0.3* | 1.5 | 1.9 |
| Comonomer content via NMR | [mol-%] | 1.7 C6 | — | 7 C2 | 7 C2 |
| Nucleation | | no | no | no | no |
| C6 acc. to Pharmacopoeia | [wt.-%] | 1.5 | <5 | 0.8 | 1.5 |
| Flexural modulus | [MPa] | 774 | 420 | 605 | 791 |
| IM specimen size | [mm × mm × mm] | 60 × 60 × 1 | 60 × 60 × 1 | 60 × 60 × 1 | 60 × 60 × 1 |
| Clarity IM | [%] | 96.5 | 59.2 | na | 91.8 |
| Haze IM | [%] | 47.4 | 74.0 | na | 36.1 |
| EBM bottle wall thickness | [mm] | 0.3 | 0.3 | 0.3 | 0.3 |
| Gloss b.s. | [%] | 33.7 | 30.3 | 32.5 | 18.5 |
| Clarity b.s. | [%] | 77.8 | 88.9 | 89.2 | 73.3 |
| Haze b.s. | [%] | 21.7 | 23.7 | 17.9 | 17.6 |
| BAF before sterilization | [—] | 121 | 114 | 162 | 77 |
| Gloss a.s. | [%] | 50.3 | 39.8 | 25.2 | 16.5 |
| Clarity a.s. | [%] | 77.0 | 86.2 | 84.9 | 70.2 |

TABLE 3-continued

EBM bottle production data and properties of the examples

| | | IE 1 | CE 3 | CE 4 | CE 5 |
|---|---|---|---|---|---|
| Haze a.s. | [%] | 11.6 | 33.4 | 22.4 | 19.3 |
| BAF after sterilization | [—] | 334 | 103 | 96 | 60 |

*$MFR_2$ measured at 190° C.
BAF Bottle Appearance Factor (BAF = Gloss * Clarity/Haze)
IM = injection molding
EBM = extrusion blow molding
b.s. = before sterilisation
a.s. = after sterilisation
na = not available CE3 is the commercial grade LE6609-PH available from Borealis A G, Austria and is a low density polyethylene having a density of 930 kg/m³ and a $MFR_2$ (190° C./2.16 kg) of 0.3 g/10 min.

CE4 is the commercial grade Purell SM170G available from LyondellBasell Industries Holdings B.V. and is a SSC propylene-ethylene random copolymer having a density of 900 kg/m³ and a $MFR_2$ (230° C.) of 1.5 g/10 min.

CE5 is the commercial grade RB801CF-01 available from Borealis A G, Austria and is a ZN propylene-ethylene random copolymer having a melting temperature of 140° C. and a $MFR_2$ (230° C.) of 1.9 g/10 min.

With injection molding specimens the haze of the inventive example IE1 was much better than that of the reference CE3 but not as good as that of the reference CE5. This trend changed when the materials were used in the EBM process. Here, the inventive example IE1 allowed the production of non-sterilised thin EBM bottles (with 0.3 mm wall thickness) with optical properties (measured via the bottle appearance factor BAF=Gloss*Clarity/Haze) which were better than those of both comparative examples CE3 and CE5. As expected, after sterilisation (121° C./30 min for IE1, CE4 and CE5, 112° C./1 hour for CE3) the haze increased for all three comparative examples and the gloss decreased for the comparative examples CE4 and CE5. The comparative examples CE3 and CE4 showed a BAF value of around 100 after sterilisation, while the BAF value for comparative example CE5 was of around 60 after sterilisation. Hence, the BAF value significantly decreased for the comparative examples CE3 to CE5 after sterilisation.

Surprisingly, sterilisation had a very different effect on the inventive example IE1. The haze was halved while the gloss was nearly doubled. The final BAF of the sterilised bottles thus improved dramatically so that it finally had a value of around 334. Additionally, due to its low C6 solubles the inventive material is suitable for BFS applications according to European Phamacopoeia 3.1.3.

The invention claimed is:

1. A blow molded article comprising a propylene copolymer composition (P), the propylene copolymer composition (P) comprising
    (a) a propylene copolymer (A) having a comonomer content of 0.1 to 2.5 mol-%, the comonomers are $C_5$ to $C_{12}$ α-olefins, and
    (b) a propylene copolymer (B) having a comonomer content of 1.0 to 7.0 mol-%, the comonomers are $C_5$ to $C_{12}$ α-olefins, wherein further
    (i) the comonomer content in the propylene copolymer (A) is lower compared to the comonomer content in the propylene copolymer (B),
    (ii) the propylene copolymer composition (P) has a comonomer content of 0.6 to 1.7 mol-%, the comonomers are $C_5$ to $C_{12}$ α-olefins.

2. The blow molded article according to claim 1, wherein the propylene copolymer (A) has
    (a) a comonomer content of 0.1 to 1.5 mol-%, the comonomers are $C_5$ to $C_{12}$ α-olefins, and/or
    (b) a melt flow rate $MFR_2$ (230° C.) measured according to ISO 1133 in the range of 0.1 to 10.0 g/10 min, and/or
    (c) a xylene soluble content (XCS) determined at 23° C. according to ISO 6427 of ≤10.0 wt.-%.

3. The blow molded article according to claim 1, wherein the propylene copolymer (B) has
    (a) a comonomer content of 1.5 to 5.0 mol-%, the comonomers are $C_5$ to $C_{12}$ α-olefins, and/or
    (b) a melt flow rate $MFR_2$ (230° C.) measured according to ISO 1133 in the range of 1.0 to 20.0 g/10 min, and/or
    (c) a xylene soluble content (XCS) determined at 23° C. according to ISO 6427 of ≤10.0 wt.-%.

4. The blow molded article according to claim 1, wherein the propylene copolymer composition (P) has
    (a) a comonomer content of 0.6 to 4.0 mol-%, the comonomers are $C_5$ to $C_{12}$ α-olefins, and/or
    (b) a melt flow rate $MFR_2$ (230° C.) measured according to ISO 1133 in the range of 1.0 to 20.0 g/10 min, and/or
    (c) a xylene soluble content (XCS) determined at 23° C. according to ISO 6427 of ≤10.0 wt.-%.

5. The blow molded article according to claim 1, wherein the comonomers
    (a) of the propylene copolymer (A) and of the propylene copolymer (B) are independently selected from the group of $C_5$ α-olefin, $C_6$ α-olefin, $C_7$ α-olefin, $C_8$ α-olefin, $C_9$ α-olefin, $C_{10}$ α-olefin, $C_{11}$ α-olefin and $C_{12}$ α-olefin, or
    (b) of the propylene copolymer (A) and of the propylene copolymer (B) are the same and are selected from the group of $C_5$ α-olefin, $C_6$ α-olefin, $C_7$ α-olefin, $C_8$ α-olefin, $C_9$ α-olefin, $C_{10}$ α-olefin, $C_{11}$ α-olefin and $C_{12}$ α-olefin.

6. The blow molded article according to claim 1, wherein the propylene copolymer composition (P) is a propylene 1-hexene copolymer.

7. The blow molded article according to claim 1, wherein the ratio MFR (A)/MFR (P) is in the range of 0.1 to 1.5, wherein
    MFR (A) is the melt flow rate $MFR_2$ (230° C.) [g/10 min] measured according to ISO 1133 of the propylene copolymer (A),
    MFR (P) is the melt flow rate $MFR_2$ (230° C.) [g/10 min] measured according to ISO 1133 of the propylene copolymer composition (P).

8. The blow molded article according to claim 1, wherein the ratio MFR (A)/MFR (B) is in the range of 0.05 to 1.5
wherein
MFR (A) is the melt flow rate $MFR_2$ (230° C.) [g/10 min] measured according to ISO 1133 of the propylene copolymer (A),
MFR (B) is the melt flow rate $MFR_2$ (230° C.) [g/10 min] measured according to ISO 1133 of the propylene copolymer (B).

9. The blow molded article according to claim 1, wherein corn (P)/com (A) is in the range of 1.0 to 6.0
wherein
com (A) is the comonomer content of the propylene copolymer (A) given in mol percent [mol-%],
com (P) is the comonomer content of the propylene copolymer composition (P) given in mol percent [mol-%].

10. The blow molded article according to claim 1, wherein
(a) the blow molded article comprises the propylene copolymer composition (P) in an amount of at least 75.0 wt.-%, based on the total weight of the blow molded article,
and/or
(b) weight ratio between the propylene copolymer (A) and the propylene copolymer (B) [(A)/(B)] is in the range of 20/80 to 80/20.

11. The blow molded article according to claim 1, wherein the blow molded article is an extrusion blow molded article.

12. The blow molded article according to claim 1, wherein the blow molded article has
(a) a bottle appearance factor (BAF) before sterilization of in-equation (Ia):

$$65 < BAF \leq 200 \qquad (Ia),$$

and/or
(b) a bottle appearance factor (BAF) after sterilization of in-equation (IIa):

$$125 < BAF \leq 450 \qquad (IIa),$$

wherein
BAF is defined as:

$$BAF = \frac{C \times G}{H}$$

wherein
H is the haze value
C is the clarity value, and
G is the gloss value
wherein haze and clarity values are measured according to ASTM D1003 and gloss is measured according to ASTM D 2457.

13. The blow molded article according to claim 11, which is an extrusion blow molded article, wherein the extrusion blow molded article is a bottle or a container.

14. A method of preparing a blow molded article comprising blow molding a propylene copolymer composition (P),
the propylene copolymer composition (P) comprising
(a) a propylene copolymer (A) having a comonomer content of 0.1 to 2.5 mol-%, the comonomers are $C_5$ to $C_{12}$ α-olefins, and
(b) a propylene copolymer (B) having a comonomer content of 1.0 to 7.0 mol-%, the comonomers are $C_5$ to $C_{12}$ α-olefins, wherein further
(i) the comonomer content in the propylene copolymer (A) is lower compared to the comonomer content in the propylene copolymer (B),
(ii) the propylene copolymer composition (P) has a comonomer content of 0.6 to 1.7 mol-%, the comonomers are $C_5$ to $C_{12}$ α-olefins.

* * * * *